(12) United States Patent
Short, Jr. et al.

(10) Patent No.: US 12,451,217 B1
(45) Date of Patent: Oct. 21, 2025

(54) METHOD AND SYSTEM FOR DETECTING AND QUANTIFYING SPECIFIC SUBSTANCES, ELEMENTS, OR CONDITIONS UTILIZING AN AI MODULE

(71) Applicant: QUANTUM IP, LLC, Stuart, FL (US)

(72) Inventors: Robert J. Short, Jr., Stuart, FL (US); Lee Duke, Stuart, FL (US); John Cronin, Stuart, FL (US); Michael D'Andrea, Stuart, FL (US); Joseph Bodkin, Stuart, FL (US)

(73) Assignee: QUANTUM IP, LLC, Stuart, FL (US)

( * ) Notice: Subject to any disclaimer, the term of this patent is extended or adjusted under 35 U.S.C. 154(b) by 0 days.

(21) Appl. No.: 18/936,177

(22) Filed: Nov. 4, 2024

Related U.S. Application Data

(60) Provisional application No. 63/668,639, filed on Jul. 8, 2024.

(51) Int. Cl.
*G16C 20/20* (2019.01)
*G01N 22/00* (2006.01)
(Continued)

(52) U.S. Cl.
CPC .............. *G16C 20/20* (2019.02); *G01N 22/00* (2013.01); *G16C 20/70* (2019.02); *G16C 20/90* (2019.02)

(58) Field of Classification Search
CPC ........ G16C 20/20; G16C 20/70; G16C 20/90; G01N 22/00
(Continued)

(56) References Cited

U.S. PATENT DOCUMENTS

| 2,116,717 A | 5/1938 | Hans |
| 3,725,917 A | 4/1973 | Sletten et al. |

(Continued)

FOREIGN PATENT DOCUMENTS

| CN | 107102325 | 8/2017 |
| CN | 117091456 | 11/2023 |

(Continued)

OTHER PUBLICATIONS

U.S. Appl. No. 18/921,840, Robert J. Short Jr., RF-Based Material Detection Device That Uses Specific Antennas Designed for Specific Substances, filed Oct. 21, 2024.
(Continued)

*Primary Examiner* — John H Le
(74) *Attorney, Agent, or Firm* — Polsinelli, LLP

(57) ABSTRACT

A method accessing a pre-trained specific material database associating each of a plurality of materials with a corresponding material profile, each material profile including one or more parameters including at least one of a transmit frequency and a response frequency; receiving a selection of a target material from a user; identifying first material profile associated with the target material using the pre-trained specific material database; transmitting, via an RF detection device, an RF signal into the target material using the one or more parameters for the target material associated with the first material profile; receiving, via the RF detection device, a response signal from the target material; analyzing the response signal using an AI algorithm to determine whether resonance characteristics of the response signal indicate a presence of the target material; and notifying the user if the presence of the target material is indicated by the resonance characteristics.

18 Claims, 4 Drawing Sheets

(51) Int. Cl.
*G16C 20/70* (2019.01)
*G16C 20/90* (2019.01)

(58) Field of Classification Search
USPC .......................................................... 702/22
See application file for complete search history.

(56) References Cited

U.S. PATENT DOCUMENTS

| | | | |
|---|---|---|---|
| 3,983,558 | A | 9/1976 | Rittenbach |
| 4,132,943 | A | 1/1979 | Gournay et al. |
| 4,217,585 | A | 8/1980 | Fishbein et al. |
| 4,296,378 | A | 10/1981 | King |
| 4,514,691 | A | 4/1985 | De Los Santos et al. |
| 4,897,660 | A | 1/1990 | Gold et al. |
| 5,227,800 | A | 7/1993 | Huguenin et al. |
| 5,233,300 | A | 8/1993 | Buess et al. |
| 5,592,083 | A | 1/1997 | Magnuson et al. |
| 5,745,071 | A | 4/1998 | Blackmon et al. |
| 6,297,765 | B1 | 10/2001 | Frazier et al. |
| 6,359,582 | B1 * | 3/2002 | MacAleese .............. G01V 3/12 342/197 |
| 6,967,612 | B1 | 11/2005 | Gorman et al. |
| 7,251,310 | B2 | 7/2007 | Smith |
| 7,288,927 | B2 | 10/2007 | Nutting et al. |
| 7,405,692 | B2 | 7/2008 | McMakin et al. |
| 7,825,648 | B2 | 11/2010 | Nutting et al. |
| 8,138,770 | B2 | 3/2012 | Pechmann et al. |
| 8,188,862 | B1 | 5/2012 | Tam et al. |
| 8,242,447 | B1 | 8/2012 | Chawla |
| 8,242,450 | B2 | 8/2012 | Gaziano |
| 8,502,666 | B1 | 8/2013 | Tam et al. |
| 8,890,745 | B2 | 11/2014 | Wahlquist et al. |
| 9,182,481 | B2 | 11/2015 | Bowring et al. |
| 9,500,609 | B1 | 11/2016 | Zank |
| 9,915,727 | B1 | 3/2018 | Reznack et al. |
| 10,204,775 | B2 | 2/2019 | Brown et al. |
| 10,229,328 | B2 | 3/2019 | Nikolova et al. |
| 10,268,889 | B2 * | 4/2019 | Brown .................... G06F 18/22 |
| 10,816,658 | B2 | 10/2020 | Frizzell |
| 10,890,656 | B2 | 1/2021 | Heinen |
| 11,280,898 | B2 | 3/2022 | Morton |
| 11,422,252 | B2 | 8/2022 | Bowring et al. |
| 11,493,494 | B2 | 11/2022 | Wilson et al. |
| 12,248,062 | B1 | 3/2025 | Short et al. |
| 12,360,234 | B1 | 7/2025 | Short et al. |
| 12,372,480 | B1 | 7/2025 | Short et al. |
| 12,379,439 | B1 | 8/2025 | Short et al. |
| 12,386,037 | B1 | 8/2025 | Short et al. |
| 2002/0008655 | A1 | 1/2002 | Haj-Yousef |
| 2003/0196543 | A1 | 10/2003 | Moser et al. |
| 2004/0039713 | A1 | 2/2004 | Beck |
| 2004/0125020 | A1 | 7/2004 | Hendler et al. |
| 2004/0232054 | A1 | 11/2004 | Brown et al. |
| 2004/0252062 | A1 | 12/2004 | Tracy et al. |
| 2005/0081634 | A1 | 4/2005 | Matsuzawa |
| 2005/0200528 | A1 | 9/2005 | Carrender et al. |
| 2005/0230604 | A1 | 10/2005 | Rowe et al. |
| 2006/0008051 | A1 | 1/2006 | Heaton et al. |
| 2006/0038563 | A1 | 2/2006 | Chrisholm et al. |
| 2007/0074580 | A1 | 4/2007 | Fallah-Rad et al. |
| 2007/0115183 | A1 | 5/2007 | Kim et al. |
| 2007/0188377 | A1 | 8/2007 | Krikorian et al. |
| 2008/0283761 | A1 | 11/2008 | Robinson et al. |
| 2009/0085565 | A1 | 4/2009 | Fullerton |
| 2009/0195435 | A1 | 8/2009 | Kapilevich et al. |
| 2009/0262005 | A1 | 10/2009 | McNeill et al. |
| 2010/0046704 | A1 | 2/2010 | Song et al. |
| 2010/0079280 | A1 | 4/2010 | Lacaze et al. |
| 2010/0128852 | A1 | 5/2010 | Yamamoto et al. |
| 2010/0134102 | A1 | 6/2010 | Crowley |
| 2010/0134254 | A1 | 6/2010 | Kim |
| 2010/0164831 | A1 | 7/2010 | Rentz et al. |
| 2010/0182594 | A1 * | 7/2010 | Carron ...................... G01J 3/44 356/73 |
| 2011/0050241 | A1 | 3/2011 | Nutting et al. |
| 2011/0233419 | A1 | 9/2011 | Norris |
| 2011/0284742 | A1 | 11/2011 | Barker et al. |
| 2012/0248313 | A1 | 10/2012 | Karam et al. |
| 2012/0256779 | A1 | 10/2012 | Nguyen et al. |
| 2015/0160181 | A1 | 6/2015 | White et al. |
| 2016/0011307 | A1 | 1/2016 | Casse et al. |
| 2016/0047757 | A1 | 2/2016 | Kuznetsov et al. |
| 2016/0124071 | A1 | 5/2016 | Baxley et al. |
| 2016/0166843 | A1 | 6/2016 | Casse et al. |
| 2016/0195608 | A1 | 7/2016 | Ruenz |
| 2016/0223666 | A1 | 8/2016 | Kim et al. |
| 2016/0274230 | A1 | 9/2016 | Wu et al. |
| 2016/0327634 | A1 | 11/2016 | Katz et al. |
| 2017/0011255 | A1 | 1/2017 | Kaditz et al. |
| 2017/0350834 | A1 | 12/2017 | Prado et al. |
| 2018/0067204 | A1 | 3/2018 | Frizzell |
| 2018/0285640 | A1 | 10/2018 | Brown et al. |
| 2019/0137653 | A1 | 5/2019 | Starr et al. |
| 2019/0154439 | A1 | 5/2019 | Binder |
| 2019/0208112 | A1 | 7/2019 | Kleinbeck |
| 2019/0219687 | A1 | 7/2019 | Baheti et al. |
| 2019/0257771 | A1 | 8/2019 | Desmulliez et al. |
| 2020/0166634 | A1 | 5/2020 | Peleg |
| 2020/0173970 | A1 | 6/2020 | Wilson et al. |
| 2020/0264298 | A1 | 8/2020 | Haseltine et al. |
| 2020/0333412 | A1 | 10/2020 | Nichols et al. |
| 2020/0371227 | A1 | 11/2020 | Malhi |
| 2021/0041376 | A1 | 2/2021 | Ashiwal et al. |
| 2021/0096240 | A1 | 4/2021 | Padmanabhan et al. |
| 2021/0312201 | A1 | 10/2021 | Hastings et al. |
| 2021/0373098 | A1 | 12/2021 | Fraundorfer et al. |
| 2022/0171017 | A1 | 6/2022 | McFadden et al. |
| 2022/0265882 | A1 | 8/2022 | Lemchen |
| 2022/0311135 | A1 | 9/2022 | Guo et al. |
| 2022/0365168 | A1 | 11/2022 | Amizur et al. |
| 2022/0408643 | A1 | 12/2022 | Somarowthu et al. |
| 2023/0243761 | A1 | 8/2023 | Somarowthu et al. |
| 2023/0375695 | A1 | 11/2023 | Tan |
| 2024/0036166 | A1 | 2/2024 | Geng et al. |
| 2024/0372600 | A1 | 11/2024 | Schreck et al. |

FOREIGN PATENT DOCUMENTS

| | | |
|---|---|---|
| JP | 2014095625 | 5/2014 |
| WO | WO 2024091157 | 5/2024 |

OTHER PUBLICATIONS

U.S. Appl. No. 18/922,682, Robert J. Short Jr., Enhanced Antenna Materials for Low-Frequency Detection of Materials, filed Oct. 22, 2024.

U.S. Appl. No. 18/922,693, Robert J. Short Jr., Dynamic Phased Array Resonator Systems and Methods for Determining a Material Substance, filed Oct. 22, 2024.

U.S. Appl. No. 18/923,518, Robert J. Short Jr., Currency RF-Based Verification Device, filed Oct. 22, 2024.

U.S. Appl. No. 18/922,702, Robert J. Short Jr., Enhanced Material Detection and Frequency Sweep Analysis of Controlled Substances via Digital Signal Processing, filed Oct. 22, 2024.

U.S. Appl. No. 18/922,729, Robert J. Short Jr., RF-Based Detection Device for Material Identification Using a Smart Frequency Selection Method, filed Oct. 22, 2024.

U.S. Appl. No. 18/929,189, Robert J. Short Jr., RF-Specific Material Detection Device for an Application-Specific Device, filed Oct. 28, 2024.

U.S. Appl. No. 18/782,964, Robert J. Short Jr., RF-Based Material Identification Systems and Methods, filed Jul. 24, 2024.

PCT/US2024/039348, Robert J. Short Jr., RF-Based Material Identification Systems and Methods, filed Jul. 24, 2024.

U.S. Appl. No. 18/934,569, Robert J. Short Jr., Networked RF Material Devices for Substance Detection via Opposed Perimeter Sensors, filed Nov. 1, 2024.

U.S. Appl. No. 18/939,132, Robert J. Short Jr., RF Material Detection Device With Smart Scanning Multiple Axis Gimbal Integrated With Haptics, filed Nov. 6, 2024.

(56) References Cited

OTHER PUBLICATIONS

U.S. Appl. No. 18/938,584, Robert J. Short Jr., RF Transmit and Receiver Antenna Detector System, filed Nov. 6, 2024.
U.S. Appl. No. 18/942,906, Robert J. Short Jr., RF-Specific Material Detection Device Integrated Into Application-Specific Drone Device, filed Nov. 11, 2024.
U.S. Appl. No. 18/936,500, Robert J. Short Jr., RF-Based Special Material Detection System With Secure Multi-Dimensional Authentication, filed Nov. 4, 2024.
U.S. Appl. No. 18/938,691, Robert J. Short Jr., RF-Based AI Determination of Materials by Cycling Through Detection Patterns for Specific Applications, filed Nov. 6, 2024.
U.S. Appl. No. 18/946,014, Robert J. Short Jr., RF-Based Special Material Detection Securing Entry Points and Access, filed Nov. 13, 2024.
PCT Application No. PCT/US2024/039348, International Search Report and Written Opinion dated Oct. 17, 2024.
U.S. Appl. No. 18/922,693, Non-Final Office Action dated Nov. 26, 2024.
U.S. Appl. No. 18/922,729, Non-Final Office Action dated Dec. 16, 2024.
U.S. Appl. No. 18/929,189, Non-Final Office Action dated Jan. 24, 2025.
U.S. Appl. No. 18/782,964, Non-Final Office Action dated Dec. 6, 2024.
U.S. Appl. No. 18/939,132, Non-Final Office Action dated Dec. 26, 2024.
U.S. Appl. No. 18/936,500, Non-Final Office Action dated Dec. 23, 2024.
U.S. Appl. No. 18/946,014, Non-Final Office Action dated Jan. 16, 2025.
Erricolo et al., "Machine Learning in Electromagnetics: A Review and Some Perspectives for Future Research," 2019 International Conference on Electromagnetics in Advanced Applications (ICEAA), Granada, Spain, 2019, pp. 1377-1380, doi: 10.1109/ICEAA.2019. 8879110.
Ibrahim et al., "A Subspace Signal Processing Technique for Concealed Weapons Detection," 2007 IEEE International Conference on Acoustics, Speech and Signal Processing—ICASSP '07, Honolulu, HI, USA, pp. II-401-II-404, doi: 10.1109/ICASSP.2007. 366257, 2007.
Itozaki et al., "Nuclear Quadrupole Resonance for Explosive Detection," International Journal on Smart Sensing and Intelligent Systems, vol. 1, No. 3, Sep. 2008.
U.S. Appl. No. 18/921,840, Non-Final Office Action dated Feb. 28, 2025.
U.S. Appl. No. 18/922,693, Final Office Action dated Mar. 17, 2025.
U.S. Appl. No. 18/938,584, Non-Final Office Action dated Feb. 24, 2025.
U.S. Appl. No. 18/922,693, Non-Final Office Action dated Jun. 4, 2025.
U.S. Appl. No. 18/929,189, Final Office Action dated Jun. 23, 2025.
U.S. Appl. No. 19/268,204, Non-Final Office Action dated Aug. 13, 2025.
U.S. Appl. No. 19/279,049, Non-Final Office Action dated Aug. 22, 2025.
PCT Application No. PCT/US2025/036318, International Search Report and Written Opinion dated Aug. 26, 2025.

\* cited by examiner

METHOD AND SYSTEM FOR DETECTING AND QUANTIFYING SPECIFIC SUBSTANCES, ELEMENTS, OR CONDITIONS UTILIZING AN AI MODULE

CROSS-REFERENCE TO RELATED APPLICATIONS

This application claims the benefit of U.S. Provisional Application No. 63/668,639, filed Jul. 8, 2024, which is incorporated herein by reference.

FIELD OF THE DISCLOSURE

The present disclosure is generally related to a method of detecting and quantifying specific substances, elements, or conditions utilizing an AI module and a predefined trained database.

BACKGROUND

Currently, traditional detection methods often require invasive procedures or the use of additional materials, which can be disruptive, costly, and impractical for certain applications. There is a need for a non-invasive method that can reliably detect and quantify specific substances without physical intrusion or the need for supplementary materials. Also, existing detection systems struggle to provide real-time quantification of substances, particularly in dynamic or rapidly changing environments. The inability to quantify substances in real-time limits the effectiveness of these systems in applications where immediate results are critical. Achieving precise localization of target substances is challenging with conventional methods, which often lack the accuracy required to pinpoint the exact location of the detected material. This lack of precision can lead to inefficiencies and errors in applications requiring detailed spatial information. Lastly, many detection systems are not optimized to use low-frequency radio signals, which are beneficial for penetrating various materials and environments. This limitation reduces their effectiveness in detecting substances in diverse or obstructed settings. Thus, there is a need in the prior art for a method of detecting and quantifying specific substances, elements, or conditions utilizing an AI module and a predefined trained database.

SUMMARY

According to one aspect, a method includes accessing a pre-trained specific material database associating each of a plurality of materials with a corresponding material profile, each material profile including one or more parameters including at least one of a transmit frequency and a response frequency. The method also includes receiving a selection of a target material from a user. The method further includes identifying first material profile associated with the target material using the pre-trained specific material database. In addition, the method includes transmitting, via an RF detection device, an RF signal into the target material using the one or more parameters for the target material associated with the first material profile. The method also includes receiving, via the RF detection device, a response signal from the target material. The method further includes analyzing the response signal using an AI algorithm to determine whether resonance characteristics of the response signal indicate a presence of the target material. The method further includes notifying the user if the presence of the target material is indicated by the resonance characteristics.

In some embodiments, transmitting includes transmitting the RF signal into the target material using the transmit frequency associated with the first material profile.

In some embodiments, analyzing the response signal includes determining a frequency of the response signal and comparing the frequency of the response signal to the response frequency associated with the first material profile.

In some embodiments, the pre-trained specific material database includes information relating a signal strength of the response signal with one or more of a quantity or a distance of the target material based on historical data, and wherein analyzing the response signal includes measuring the signal strength of the response signal and determining the quantity of the target material or the distance of the target material based on the measured signal strength of the response signal based on the information.

In some embodiments, a stronger response signal indicates a larger quantity of the target material or a closer distance of the target material.

In some embodiments, the transmit frequency is related to an atomic structure of the target material.

In some embodiments, the first material profile includes a plurality of transmit frequencies for the target material, and wherein transmitting includes transmitting the RF signal into the target material using the plurality of transmit frequencies.

In some embodiments, the method further includes determining, prior to transmitting the RF signal, one or more contextual environmental conditions, wherein the AI algorithm uses the one or more contextual environmental conditions to determine whether the resonance characteristics for the target material are present.

In some embodiments, the one or more contextual environmental conditions include, for the RF detection device and/or the target material, one or more of a temperature; a humidity; a time; and a geolocation.

In some embodiments, the pre-trained specific material database includes an AI model, and the AI model is pre-trained by associating response signals with RF frequencies transmitted into known materials.

According to another aspect, a system includes a user interface configured to receive a selection by a user of a target material. The system also includes a communication interface configured to access a first material profile for the target material in a pre-trained specific material database associating each of a plurality of materials with a corresponding material profile, each material profile including one or more parameters including at least one of a transmit frequency and a response frequency. The system further includes an RF transmitter configured to transmit an RF signal into the target material using the one or more parameters for the target material associated with the first material profile. In addition, the system includes an RF receiver configured to receive a response signal from the target material. The system additionally includes a processor configured to analyze the response signal using an AI algorithm to determine whether resonance characteristics of the response signal indicate a presence of the target material. The system also includes the user interface is further configured to notify the user if the presence of the target material is indicated by the resonance characteristics.

In some embodiments, the RF transmitter is configured to transmit the RF signal into the target material using the transmit frequency associated with the first material profile.

In some embodiments, the processor is configured to analyze the response signal by determining a frequency of the response signal and comparing the frequency of the response signal to the response frequency associated with the first material profile.

In some embodiments, the pre-trained specific material database includes information relating a signal strength of the response signal with one or more of a quantity or a distance of the target material based on historical data, wherein the processor is configured to analyze the response signal by measuring the signal strength of the response signal and determining the quantity of the target material or the distance of the target material based on the measured signal strength of the response signal based on the information.

In some embodiments, a stronger response signal indicates a larger quantity of the target material or a closer distance of the target material.

In some embodiments, the transmit frequency is related to an atomic structure of the target material.

In some embodiments, the first material profile includes a plurality of transmit frequencies for the target material, and wherein the RF transmitter is further configured to transmit the RF signal into the target material using the plurality of transmit frequencies.

In some embodiments, the system further includes one or more sensors configured, prior to transmitting the RF signal, to determine one or more contextual environmental conditions; wherein the AI algorithm uses the one or more contextual environmental conditions to determine whether the resonance characteristics for the target material are present.

In some embodiments, the one or more contextual environmental conditions include, for the RF receiver and/or the target material, one or more of a temperature; a humidity; a time; and a geolocation.

In some embodiments, the pre-trained specific material database includes an AI model, and the AI model is pre-trained by associating response signals with RF frequencies transmitted into known materials.

DETAILED DESCRIPTION

Embodiments of the present disclosure will be described more fully hereinafter with reference to the accompanying drawings in which like numerals represent like elements throughout the several figures, and in which example embodiments are shown. Embodiments of the claims may, however, be embodied in many different forms and should not be construed as limited to the embodiments set forth herein. The examples set forth herein are non-limiting examples and are merely examples among other possible examples.

Figure 1:
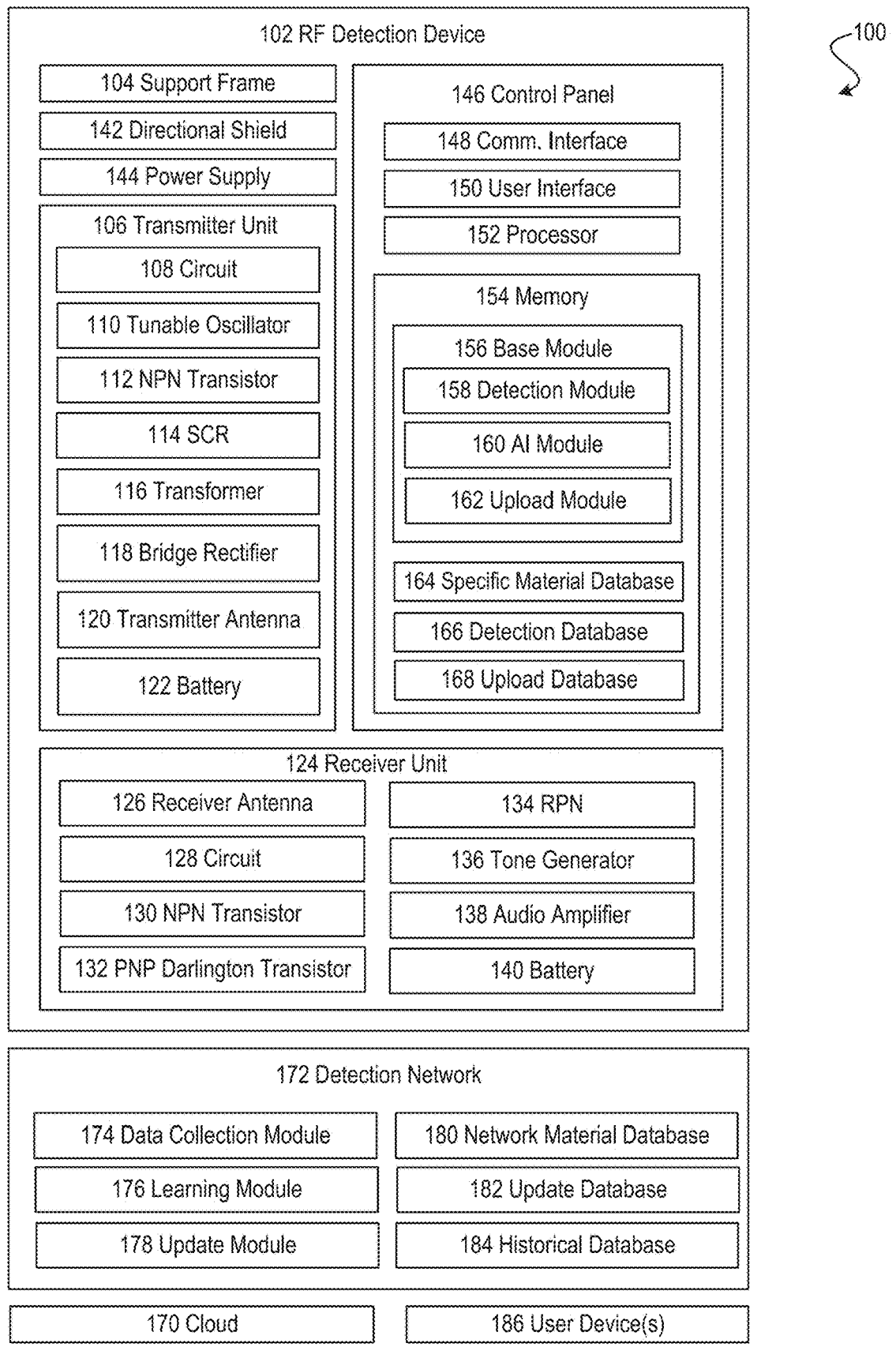
FIG. 1 is a schematic diagram of an RF Detection System with an AI Module and a Predefined Trained Database, according to an embodiment.

FIG. 1 illustrates an RF detection system 100 with an AI module and a predefined trained database. The system 100 includes an RF detection device 102, which may be a specialized device designed to detect and identify specific materials based on their unique resonance frequencies when exposed to electromagnetic signals. The RF detection device 102 incorporates an RF detection system similar to that disclosed in U.S. Pat. No. 11,493,494B2, employing RF signals for the detection and identification of materials based on their resonance characteristics. The RF detection device 102 may operate by transmitting RF signals into the environment and analyzing the received signals for resonance characteristics that indicate the presence of a target material. The RF detection device 102 may be designed to detect a target material based on its resonance properties with specific RF frequencies. It utilizes the principle that materials resonate at particular frequencies when exposed to external RF signals, allowing for their identification and potential quantification. The RF detection device 102 may include a transmitter unit 106, a receiver unit 124, a control panel 146, a transmitter antenna 120, a receiver antenna 126, a directional shield 142, and a power supply 144. Upon activation, the control panel 146 initializes the system 100, powering up the transmitter unit 106, the receiver unit 124, and associated electronics. The control panel 146 may instruct the transmitter unit 106 to generate RF signals at specified frequencies, such as 180 Hz, 1800 Hz, etc., and amplitudes, such as 320V, 160V, etc., known to resonate with a target material. The transmitter unit 106 emits these RF signals through the transmitter antenna 120 into the testing environment. The receiver unit 124 captures the RF signals using the receiver antenna 126. It then processes the received signals to identify resonance frequencies that indicate the presence of the target material.

Further, embodiments may include a support frame 104, which may be a structural component designed to provide stability and support to various subsystems and components of the RF detection device 102. The support frame 104 may provide proper alignment and positioning of the components, such as the transmitter unit 106, receiver unit 124, and control panel 146. The support frame 104 may provide mounting points and secure attachment locations for subsystems such as the transmitter unit 106, receiver unit 124, and control panel 146. By maintaining precise alignment and stability, the support frame 104 may minimize vibrations and unwanted movements that could interfere with the accuracy of RF signal transmission and reception. In some embodiments, the support frame 104 may be constructed from durable materials such as metal alloys or rigid polymers.

Further, embodiments may include a transmitter unit 106, which may include an electronic circuit 108, powered by a battery 122, such as a 12-volt, 1.2 amp battery, with a regulated output of nine volts. The circuit 108 may use a 555 timer as a tunable oscillator 110 to generate a pulse rate. The output of the oscillator 110 is fed in parallel to an NPN transistor 112 and a silicon-controlled rectifier or SCR 114. The transistor may be used as a common emitter amplifier stage driving a transformer 116. The transformer 116 may be used to step up the voltage as needed. The balanced output of the transformer 116 feeds a bridge rectifier 118. The rectified direct current flows through a 100 K, three-watt resistor to terminal B of the transmitter antenna 120. A plurality of resistors and capacitors may fill in the circuit 108. In some embodiments, the transmitter antenna 120 may be formed from a coil of about 25 meters of 14-strand wire tightly wound around a one-centimeter PVC core. The transmitter antenna 120 may be, in one exemplary embodiment, in a 1"×3" configuration at the bottom end of the support frame 104. In some embodiments, the transmitter antenna 120 may be shielded approximately 315 degrees with the directional shield 142, formed from aluminum and copper, leaving a two-inch opening. Terminal A of the transmitter antenna 120 is switched to ground through the SCR 114. The SCR 114 is "fired" by the output of the 555 timer. This particular configuration generates a narrow pulsed waveform to the transmitter antenna 120 at a pulse rate as set by the 555 timer. Power is delivered through the 3 W resistor. Frequencies down to 4 Hz are achieved by an RC network containing a 100 K pot, a switch, and one of two capacitive paths. The circuit 108 may provide simple RC-controlled timing and deliver pulses to the primary of a step-up transformer 116, the output of which is full-wave rectified and fed to the transmitter antenna 120. The pulse rate is adjustable from the low Hz range to the low kHz range. The sharp pulses at low repetition frequencies yield a wide spectrum of closely spaced lines. The pulse rate is adjusted depending on the material to be detected. In some embodiments, one or more portions of the transmitter unit 106 may be implemented in an analog circuit configuration, a digital circuit configuration, or some combination thereof. In one example, the analog configuration may include one or more analog circuit components, such as, but not limited to, operational amplifiers, op-amps, resistors, inductors, and capacitors. In another example, the digital configuration may include one or more digital circuit components, such as, but not limited to, microprocessors, logic gates, and transistor-based switches. In some instances, a given logic gate may include one or more electronically controlled switches, such as transistors, and the output of a first logic gate may control one or more logic gates disposed "downstream" from the first logic gate.

Further, embodiments may include a circuit 108, which may be an assembly of electronic components that generate, modulate, and transmit radio frequency, RF, signals. The circuit 108 may include oscillators 110, amplifiers, modulators, and other components that work together to produce a specific RF signal, which can then be transmitted through the transmitter antenna 120. The circuit 108 may include an oscillator 110, which generates a stable RF signal at a specified frequency. This frequency is selected based on the resonance characteristics of the target material. For example, the system 100 may operate at 180 Hz or 1800 Hz, depending on the specific requirements of the detection task. Once generated, the RF signal is fed into an amplifier. The amplifier boosts the signal strength to a level suitable for transmission over the required distance. This ensures that the signal can propagate through various media and reach the receiver unit 124 effectively. Modulation circuits are used to encode information into the RF signal. This may involve varying the amplitude, frequency, or phase of the signal to carry specific data related to the detection process. Modulation ensures that the transmitted signal can be uniquely identified and distinguished from other signals in the environment. The circuit 108 may include power control components that regulate the voltage and current supplied to the oscillator 110 and amplifier. This ensures consistent signal output and helps in managing the power consumption of the device. In some embodiments, the transmitter unit 106 may operate at voltages such as 160V and 320V, with adjustments made to optimize detection performance. The amplified and modulated RF signal is then routed to the transmitter antenna 120. The transmitter antenna 120 converts the electrical signal into an electromagnetic wave that can propagate through the air or other media. In some embodiments, the circuit 108 may be integrated with the device's control systems, allowing for automated adjustments based on pre-set parameters or operator inputs.

Further, embodiments may include a tunable oscillator 110, which may be a type of electronic component that generates a periodic waveform with a frequency that can be adjusted or tuned over a specific range. The tunable oscillator 110 within the transmitter unit 106 may be utilized to generate the RF signal that will be transmitted by the RF detection device 102. The tunable oscillator 110 in the transmitter unit 106 may be employed to produce an RF signal whose frequency can be precisely controlled. By adjusting the control inputs, the frequency of the output signal can be varied, allowing the system 100 to adapt to different detection requirements and environmental conditions. This tuning mechanism may ensure that the oscillator 110 produces a signal at the correct frequency needed for effective resonance with the target materials. By tuning the oscillator 110 to specific frequencies, the system 100 may detect various substances based on their unique resonant properties. The tunable oscillator 110 may work in conjunction with the control panel 146, which sends control signals to adjust the oscillator's 110 frequency as needed. The tunable oscillator 110 may act as the core signal generation component in the transmitter unit 106. When the control panel 146 determines the required frequency for detection, it sends control signals to the tunable oscillator 110. The oscillator 110 then adjusts its frequency accordingly, generating an RF signal that matches the desired parameters. The tunable oscillator 110 may be connected to other components within the transmitter unit 106, such as the SCR 114 and the transformer 116. The SCR 114 manages the power supply to the oscillator 110, ensuring it receives the correct voltage. The transformer 116 steps up the voltage to the appropriate level required by the oscillator 110.

Further, embodiments may include an NPN transistor 112, which may be a type of bipolar junction transistor, BJT, that consists of three layers of semiconductor material: a layer of p-type material, the base layer, sandwiched between two layers of n-type material, the emitter and the collector. When a small current flows into the base, it allows a larger current to flow from the collector to the emitter, effectively acting as a current amplifier or switch in electronic circuits. The NPN transistor 112 in the transmitter unit 106 amplifies the RF signal generated by the oscillator 110. The NPN transistor 112 may operate in its active region, where a small input current applied to the base controls a larger current flowing from the collector to the emitter. This amplification process ensures that the RF signal reaches a sufficient power level for effective transmission. In some embodiments, the NPN transistor 112 may also function as a switch, controlling the flow of current within the circuit 108. When the base-emitter junction is forward-biased, a small voltage is applied, and the NPN transistor 112 allows current to flow from the collector to the emitter. This switching action is used to modulate the RF signal, encoding information onto the carrier wave as required for the detection process. Proper biasing of the NPN transistor 112 is helpful for stable operation. In some embodiments, resistors may be used to establish the correct biasing conditions to ensure that the NPN transistor 112 operates in its linear region for amplification or in saturation/cutoff regions for switching. The biasing circuit ensures that the NPN transistor 112 responds predictably to input signals, maintaining signal integrity. In some embodiments, the NPN transistor 112 may be involved in modulating the RF signal. By varying the input current to the base, the amplitude, frequency, or phase of the RF signal can be modulated. This modulation is critical for encoding the detection data onto the transmitted signal, allowing for accurate identification and analysis. In some embodiments, the NPN transistor 112 may be integrated into the broader transmitter circuit 108, working in conjunction with other components such as capacitors, inductors, and resistors. This integration ensures that the NPN transistor's 112 amplification and switching actions are synchronized with the overall signal generation and transmission process. The circuit 108 design may leverage the NPN transistor's 112 properties to achieve the desired RF output characteristics.

Further, embodiments may include an SCR 114, or silicon-controlled rectifier, which may be a type of semiconductor device that functions as a switch and rectifier, allowing current to flow only when a control voltage is applied to its gate terminal. The SCR 114 is utilized within the transmitter unit 106 to manage and control the power delivery to the RF signal generation components. The SCR 114 in the transmitter unit 106 may be employed to control the flow of power to the RF oscillator 110 circuit 108. By applying a gate signal to the SCR 114, it switches from a non-conductive state to a conductive state, allowing current to pass through and power the oscillator 110. This control mechanism ensures that the oscillator 110 only receives power when required, thereby conserving energy and preventing unnecessary power dissipation. The SCR 114 may act as a switching element in the transmitter unit 106. When the control panel 146 determines that the RF signal needs to be generated, a gate voltage is applied to the SCR 114. This triggers the SCR 114 to conduct, completing the circuit and enabling current to flow to the RF oscillator 110. The SCR 114 may ensure that sufficient current is supplied to the oscillator 110 to produce a strong RF signal without being damaged by the high power levels. The gate terminal of the SCR 114 may be connected to the control panel 146, which manages the timing and application of the gate signal. This integration ensures that the SCR 114 is activated precisely when the RF signal needs to be transmitted, in sync with the overall operation of the RF detection device 102. The control panel 146 sends the appropriate signal to the SCR 114, ensuring accurate timing and efficient power usage. The SCR 114 may also serve as a protective component in the transmitter unit 106. By controlling the power flow, it prevents overloading and potential damage to the RF oscillator 110 and other sensitive components. If the system 100 detects any abnormal conditions, the control panel 146 can withhold the gate signal, keeping the SCR 114 in a non-conductive state and thereby cutting off power to protect the circuit 108.

Further, embodiments may include a transformer 116, which is an electrical device that transfers electrical energy between two or more circuits through electromagnetic induction. The transformer 116 is utilized within the transmitter unit 106 to manage and control the voltage levels required for the RF signal generation and transmission. The transformer 116 in the transmitter unit 106 may be employed to step up or down the voltage as needed to ensure the proper operation of the RF oscillator 110 circuit 108. By adjusting the voltage levels, the transformer 116 ensures that the components within the transmitter unit 106 receive the appropriate voltage for efficient functioning. The transformer 116 may act as a voltage regulation element in the transmitter unit 106. When the control panel 146 determines that the RF signal needs to be generated, the transformer 116 adjusts the input voltage to the desired level. This adjustment involves converting the primary winding voltage to a higher or lower voltage in the secondary winding, depending on the requirements of the RF oscillator 110. The transformer 116 ensures that the oscillator 110 receives a stable and appropriate voltage, which is critical for producing a consistent and strong RF signal. The primary winding of the transformer 116 may be connected to the battery 122, while the secondary winding is connected to the RF oscillator 110. This integration ensures that the transformer 116 can effectively manage the voltage levels needed for RF signal generation. The control panel 146 monitors and regulates the input voltage to the transformer 116, ensuring accurate and efficient voltage conversion and delivery to the RF oscillator 110.

Further, embodiments may include a bridge rectifier 118, which is an electrical device designed to convert alternating current, AC, to direct current, DC, using a combination of four diodes arranged in a bridge configuration. The bridge rectifier 118 is utilized within the transmitter unit 106 to ensure that the RF signal generation components receive a steady and reliable DC power supply. The bridge rectifier 118 in the transmitter unit 106 may be employed to convert the incoming AC voltage from the battery 122 into a DC voltage. By using all portions of the AC waveform, the bridge rectifier 118 provides full-wave rectification, resulting in a more efficient conversion process and producing a smoother and more stable DC output. The bridge rectifier 118 may act as a power conversion element in the transmitter unit 106. When the control panel 146 determines that the RF signal needs to be generated, the AC voltage supplied to the transmitter unit 106 is passed through the bridge rectifier 118. The bridge rectifier 118 converts the AC voltage into a DC voltage by directing the positive and negative halves of the AC waveform through the appropriate diodes. This process results in a continuous DC voltage output that is used to power the RF oscillator 110 and other critical components. The input terminals of the bridge rectifier 118 may be connected to an AC power supply, while the output terminals provide the rectified DC voltage to the RF oscillator 110 circuit 108. This integration ensures that the bridge rectifier 118 can effectively convert and deliver the required DC power for RF signal generation. The control panel 146 monitors the output of the bridge rectifier 118, ensuring that the DC voltage is stable and within the desired range for optimal performance.

Further, embodiments may include a transmitter antenna 120, which may be a device that radiates radio frequency, RF, signals generated by the transmitter unit 106 towards a target material. The transmitter antenna 120 may be designed to efficiently transmit the generated RF signals into the surrounding environment and ensure the signals reach the intended target with minimal loss. The transmitter antenna 120 may be responsible for the emission of RF signals for detecting materials at a distance. In some embodiments, the transmitter antenna 120 may operate within a specific frequency range suitable for detecting the atomic structures and characteristics of the target materials. The frequency range may be determined by the system's requirements and the properties of the materials being detected. In some embodiments, the gain of the transmitter antenna 120 may be a measure of its ability to direct the RF energy toward the target. Higher gain antennas focus the energy more effectively, resulting in stronger signal transmission over longer distances. The transmitter antenna 120 gain may be optimized for the operational frequency range. In some embodiments, the radiation pattern of the transmitter antenna 120 describes the distribution of radiated energy in space. For effective material detection, the transmitter antenna 120 may have a directional radiation pattern, concentrating the RF energy in a specific direction to enhance detection accuracy. In some embodiments, impedance matching between the transmitter antenna 120 and the transmitter unit 106 may maximize power transfer and minimize signal response. Proper impedance matching may ensure efficient operation and reduce losses in the transmission path. In some embodiments, the physical design of the transmitter antenna 120 may include configurations such as dipole, patch, or horn antennas, depending on factors such as frequency range, gain, and environmental conditions. In some embodiments, the transmitter antenna 120 may be integrated with the transmitter unit 106 and other system components through connectors and mounting structures to ensure stable and reliable operation, with considerations for minimizing interference and signal loss.

Further, embodiments may include a battery 122, which may be a type of energy storage device that provides a stable and portable power source for the transmitter unit 106. The battery 122 within the transmitter unit 106 may be utilized to supply electrical energy to the various components involved in generating and transmitting the RF signal. The battery 122 may be designed to store electrical energy and supply it to the respective components as required. The battery 122 may be rechargeable or replaceable cells capable of providing DC voltage. They are selected based on factors such as voltage output, and capacity, which may be measured in ampere-hours, Ah, and size to meet the power requirements of each component effectively. In the transmitter unit 106, battery 122 may serve as a portable power source, enabling the generation and transmission of RF signals without requiring a direct connection to an external power supply. The battery 122 may power components such as the oscillator 110 circuit 108, SCR 114, and transformer 116, ensuring continuous operation in various environmental conditions. In some embodiments, the battery 122 used may include lithium-ion, nickel-metal hydride, or other types suitable for portable electronic devices.

Further, embodiments may include a receiver unit 124, which may include the electronic circuit 128. Voltage from the receiver antenna 126 passes through a 10 K gain pot to an NPN transistor 130 used as a common emitter. The output is capacitively coupled to a PNP Darlington transistor 132. A plurality of resistors and capacitors fills in the circuit 128. The output is fed through a RPN 134 to a 555 timer that is used as a voltage-controlled oscillator. A received signal of a given amplitude generates an audible tone at a given frequency. In some embodiments, the output is fed to a tone generator 136, such as a speaker, via a standard 386 audio amp. Sounds can be categorized as "grunts," "whines," and a particular form of whine with a higher harmonic notably present. In some embodiments, another indicator of a received signal is used, such as light, vibration, digital display, or analog display, in alternative to or in combination with the sound signal. A battery 140 may be used to power the receiver circuit 128. The receiver circuit 128 may utilize a coherent, direct-conversion mixer, homodyne, with RF gain, yielding a baseband signal centered about DC. After a baseband gain stage, the baseband signal is fed to another timing circuit that functions as a voltage-controlled audio-frequency oscillator. The output of this oscillator is amplified and fed to a speaker. In some embodiments, one or more portions of the receiver unit 124 may be implemented in an analog circuit configuration, a digital circuit configuration, or some combination thereof. In one example, the analog configuration may include one or more analog circuit components, such as, but not limited to, operational amplifiers 138, op-amps, resistors, inductors, and capacitors. In another example, the digital configuration may include one or more digital circuit components, such as, but not limited to, microprocessors, logic gates, and transistor-based switches. In some instances, a given logic gate may include one or more electronically controlled switches, such as transistors, and the output of a first logic gate may control one or more logic gates disposed "downstream" from the first logic gate.

Further, embodiments may include a receiver antenna 126, which may be a device that captures the radio frequency, RF, signals responded from a target material. The receiver antenna 126 may be designed to efficiently receive the responded RF signals and transmit them to the receiver unit 124 for further processing and analysis. The receiver antenna 126 may be responsible for capturing the RF signals that have interacted with the target material. In some embodiments, the receiver antenna 126 may be designed to operate within the same frequency range as the transmitter antenna 120 to ensure compatibility and optimal performance for detecting the atomic structures and characteristics of the target materials. In some embodiments, the sensitivity may be a measurement of the receiver antenna's 126 ability to detect weak signals. A highly sensitive receiver antenna 126 may detect low-power responded signals, enhancing the system's detection capabilities. In some embodiments, the noise figure of the receiver antenna 126 may indicate the level of noise it introduces into the received signal. A lower noise figure may be desirable as it ensures that the captured signals are as clean and strong as possible for accurate processing. In some embodiments, proper impedance matching between the receiver antenna 126 and the receiver unit 124 may minimize signal response and maximize the power transfer from the receiver antenna 126 to the processing unit to ensure efficient and accurate signal reception. In some embodiments, the directional properties of the receiver antenna 126 may determine its ability to capture signals from specific directions to distinguish signals responded from the target material versus other sources of interference. In some embodiments, the gain of the receiver antenna 126 may enhance its ability to receive signals from distant targets. Higher gain receiver antennas 126 can improve the system's ability to detect materials at greater distances. In some embodiments, the physical design of the receiver antenna 126 may include various configurations such as dipole, patch, or parabolic antennas and may be based on factors such as frequency range, gain, and the specific detection requirements. In some embodiments, the receiver antenna 126 may be integrated with the receiver unit 124 and other system components through connectors and mounting structures to ensure stable and reliable operation, with considerations for minimizing interference and signal loss. In some embodiments, the receiver antenna 126 and the transmitter antenna 120 may be a single antenna used by the RF detection device 102.

Further, embodiments may include a circuit 128 within the receiver unit 124, which may be an assembly of electrical components designed to process the received RF signal. The circuit 128 may accurately interpret the RF signals responded or emitted from the target substances and convert them into data that can be analyzed by the RF detection device 102. The circuit 128 in the receiver unit 124 may be employed to handle signal amplification, filtering, demodulation, and signal processing. When an RF signal is received via the receiver antenna 126, it is typically weak and may contain noise or interference. The first stage of the circuit 128 may involve an amplifier that boosts the signal strength to a level suitable for further processing. This amplification ensures that even weak signals can be analyzed effectively. Next, the circuit 128 may include filtering components that serve to remove unwanted frequencies and noise from the received signal. Filters ensure that the relevant frequency components of the RF signal are passed through, enhancing the signal-to-noise ratio and improving the clarity of the data. The circuit 128 may also incorporate a demodulator, which extracts the original information-bearing signal from the modulated RF carrier wave. This step interprets the data encoded in the RF signal, allowing the system 100 to identify specific characteristics or signatures of the target substances. In some embodiments, the circuit 128 may include various signal processing components, such as analog-to-digital converters, ADCs, which convert the analog RF signal into digital data. This digital data may then be processed by the control panel 146 or other computational units within the system for detailed analysis. The signal processing may involve algorithms to detect specific patterns, frequencies, or anomalies that indicate the presence of target materials. The components within the circuit 128 interact seamlessly to ensure accurate and efficient signal processing. For example, the amplified signal from the amplifier is passed to the filter, which cleans up the signal before it reaches the demodulator. The demodulated signal is then digitized by the ADC and sent to the control panel 146 for analysis.

Further, embodiments may include an NPN transistor 130, which may be a three-terminal semiconductor device used for amplification and switching of electrical signals. The NPN transistor 130 may consist of three layers of semiconductor material: a thin middle layer, or base, between two heavily doped layers, or emitter and collector. The NPN transistor 130 operates by controlling the flow of current from the collector to the emitter, regulated by the voltage applied to the base terminal. The NPN transistor 130 integrated into the receiver unit 124 may be designed to process incoming RF signals and may operate in a configuration where the base-emitter junction is forward-biased by a small control voltage, provided by preceding stages of the circuit 128. The collector of the NPN transistor 130 may be connected to the circuit's 128 supply voltage through a load resistor. When a small current flows into the base terminal, it allows a larger current to flow from the collector to the emitter. This amplification process increases the strength of the received signal, enabling subsequent stages of the circuit 128 to process it more effectively. In the receiver unit 124, the NPN transistor 130 may be employed within amplifier stages where signal gain is beneficial. By controlling the base current, the circuit 128 can modulate the NPN transistor's 130 conductivity and thereby regulate the amplification factor. This capability enhances weak RF signals received by the receiver antenna 126 and prepares them for further processing. In some embodiments, the NPN transistor 130 may be utilized in conjunction with capacitors and resistors to form amplifier circuits tailored to the specific requirements of the RF detection device 102. Capacitors may be used to couple AC signals while blocking DC components, ensuring that only the RF signal is amplified. Resistors set the biasing and operating points of the transistor, optimizing its performance within the circuit 128.

Further, embodiments may include a PNP Darlington transistor 132, which may be a semiconductor device consisting of two PNP transistors 132 connected in a configuration that provides high current gain. The PNP Darlington transistor 132 integrates two stages of amplification in a single package, where the output of the first transistor acts as the input to the second, significantly boosting the overall gain of the circuit 128. The PNP Darlington transistor 132 amplifies weak RF signals received by the receiver antenna 126. The incoming RF signal is fed into the base of the first PNP transistor 132 within the Darlington pair. The PNP Darlington transistor 132, due to its high current gain, allows a much larger current to flow from its collector to the emitter compared to the base current. The output from the collector of the first transistor serves as the input to the base of the second PNP transistor 132 in the Darlington pair. The second PNP transistor 132 further amplifies the signal received from the first stage, again with significant current gain.

Further, embodiments may include an RPN 134, or resistor potentiometer network, which may be an electrical circuit composed of resistors and potentiometers interconnected in a specific configuration to achieve desired electrical characteristics, such as voltage division, signal attenuation, or adjustment of resistance values. Potentiometers, also known as variable resistors, allow for manual adjustment of resistance within the circuit, while resistors set fixed values to control current flow and voltage levels. The RPN 134 in the receiver unit 124 may be configured to adjust signal levels received from the receiver antenna 126 and prepare them for further processing. The RPN 134 consists of resistors and potentiometers connected to achieve precise voltage division and attenuation. By adjusting the potentiometers, operators can fine-tune the signal strength and impedance matching, optimizing signal quality for subsequent stages of signal processing. The RPN 134 ensures that incoming RF signals from the receiver antenna 126 are properly attenuated and scaled to match the input requirements of downstream electronics. This calibration process maintains signal integrity and fidelity throughout the reception and decoding process. In some embodiments, the potentiometers within the RPN 134 may allow for manual adjustment of signal parameters such as amplitude and impedance, enabling operators to optimize signal reception based on environmental conditions and operational requirements.

Further, embodiments may include a tone generator 136, which may be a type of electronic device that produces audio signals or tones to alert the user of specific conditions. The tone generator 136 within the receiver unit 124 is utilized to generate audible alerts when the RF detection device 102 identifies the presence of target materials. The tone generator 136 in the receiver unit 124 may be employed to create specific tones that serve as audible indicators for the user. By generating these tones, the tone generator 136 provides immediate feedback to the operator, signaling the detection of target materials in real time. The tone generator 136 may ensure that the operator is promptly informed of detections without needing to constantly monitor visual displays. The tone generator 136 produces distinct sounds that correspond to different detection events, making it easier for the operator to understand the system's status and respond accordingly. The tone generator 136 may act as a critical alerting component within the receiver unit 124. When the control panel 146 determines that the RF signal corresponds to a detected target material, it sends a signal to the tone generator 136. This triggers the tone generator 136 to produce a sound, alerting the operator to the detection event.

Further, embodiments may include an audio amplifier 138, which may be a type of electronic device designed to increase the amplitude of audio signals. The audio amplifier 138 within the receiver unit 124 may be utilized to boost the audio signals generated by the tone generator 136, ensuring that the output sound is sufficiently loud and clear for the operator to hear. The audio amplifier 138 in the receiver unit 124 may be employed to enhance the volume and clarity of the audio tones produced by the tone generator 136. By amplifying these audio signals, the audio amplifier 138 ensures that the operator receives audible alerts even in noisy environments, thus improving the overall effectiveness of the detection system. The audio amplifier 138 may act as an intermediary component between the tone generator 136 and the output device, such as a speaker. When the tone generator 136 produces an audio signal, this signal is sent to the audio amplifier 138. The audio amplifier 138 then boosts the signal's power, making it strong enough to drive the speaker and produce an audible sound. The audio amplifier 138 is connected to other components within the receiver unit 124, including the tone generator 136 and the speaker. It receives the low-power audio signals from the tone generator 136 and amplifies them to a level suitable for driving the speaker.

Further, embodiments may include a battery 140, which may be a type of energy storage device that provides a stable and portable power source for the receiver unit 124. The battery 140 within the receiver unit 124 may be utilized to supply electrical energy to the various components involved in generating and transmitting the RF signal. The battery 140 may be designed to store electrical energy and supply it to the respective components as required. The battery 140 may be rechargeable or replaceable cells capable of providing DC voltage. They are selected based on factors such as voltage output, and capacity, which may be measured in ampere-hours, Ah, and size to meet the power requirements of each component effectively. In the receiver unit 124, batteries 140 may provide electrical energy to receive and process RF signals detected by the receiver antenna 126. The battery 140 may power components such as amplifiers 138, filters, and signal processing circuitry, enabling the device to analyze incoming RF signals and extract relevant information. In some embodiments, the battery 140 used may include lithium-ion, nickel-metal hydride, or other types suitable for portable electronic devices.

Further, embodiments may include a directional shield 142, which may be a physical barrier or enclosure designed to direct or block electromagnetic radiation in a specific direction. The directional shield 142 may be constructed from conductive materials such as metal to attenuate RF signals, thereby controlling the propagation of electromagnetic waves. The directional shield 142 may be positioned around the RF oscillator 110 and transmitter antenna 120 components and may act as a physical barrier that prevents RF signals from propagating in undesired directions, thereby enhancing the precision and accuracy of signal transmission and reception. During operation, when the transmitter unit 106 generates an RF signal, the directional shield 142 helps to focus and channel this signal towards the intended detection area. By reducing signal dispersion, the directional shield 142 improves the efficiency of signal transmission and enhances the system's overall sensitivity to detecting RF responses from underground objects or materials.

Further, embodiments may include a power supply 144, such as batteries serving as the power source for specific components within the RF detection device 102, including the control panel 146. This power supply 144 may be designed to store electrical energy and supply it to the respective components as required. The power supply 144 for the control panel 146 may be rechargeable or replaceable cells capable of providing DC voltage. The power supply 144 may be selected based on factors such as voltage output, and capacity, which may be measured in ampere-hours, Ah, and size to meet the power requirements of each component effectively. In some embodiments, the control panel 146 may rely on the power supply 144 to maintain functionality for user interface operations, data processing, and communication with other parts of the RF detection device 102. The power supply 144 in the control panel 146 may ensure that it remains operational during field use, supporting tasks such as signal monitoring, parameter adjustment, and data transmission. In some embodiments, the power supply 144 used in these components may include lithium-ion, nickel-metal hydride, or other types suitable for portable electronic devices. The power supply 144 may be integrated into the design to provide sufficient power capacity and longevity, allowing the RF detection device 102 to operate autonomously for extended periods between recharges or replacements.

Further, embodiments may include a control panel 146, which may be a centralized interface comprising electronic controls and displays. The control panel 146 may serve as the user-accessible interface for configuring, monitoring, and managing the RF detection device's 102 operational parameters and data output. In some embodiments, the control panel 146 may be designed to provide operators with intuitive access to control and monitor various aspects of the RF detection device 102. The control panel 146 may allow for the configuration of settings such as signal frequency, transmission power, receiver sensitivity, and signal processing algorithms. In some embodiments, operators may use the control panel 146 to initiate and terminate detection operations, adjust calibration settings, and troubleshoot operational issues. In some embodiments, the control panel 146 may include a graphical display screen or LED indicators to present real-time status information and measurement results. In some embodiments, input controls such as buttons, knobs, or touch-sensitive panels may enable operators to interact with the device, input commands, and navigate through menu options. The control panel 146 may interface directly with the internal electronics of the RF detection device 102, including the transmitter unit 106, receiver unit 124, transmitter antenna 120, receiver antenna 126, and signal processing circuitry. Through electronic connections and communication protocols, the control panel 146 may send commands to adjust operational parameters and receive feedback and status updates from the RF detection device 102. In some embodiments, the control panel 146 may be mounted on the support frame 104 and may provide an operator with control of the RF detection device 102, including adjusting various settings and signaling the operator of a detected material. In some embodiments, a rechargeable power supply 144 may power the RF detection device 102, including the transmitter unit 106, the receiver unit 124, and the control panel 146. In some embodiments, multiple batteries may be used. In some embodiments, a tone generator 136, such as a speaker, may be mounted to the support frame 104 to provide audible signals to the operator for detecting target materials.

Further, embodiments may include a communication interface 148, which may be a hardware and software solution that enables data exchange between different systems or components within a network. The communication interface 148 may act as a bridge, facilitating the transfer of information by converting data into a format that can be transmitted and received by different devices. In some embodiments, the communication interface 148 may support various protocols and standards, such as Ethernet, Wi-Fi, Bluetooth, USB, and others, depending on the application requirements. For example, an Ethernet interface may be used for wired network connections, providing reliable and high-speed data transfer. In some embodiments, a Wi-Fi interface may enable wireless connectivity, allowing the device to communicate with remote servers, mobile devices, or cloud-based applications without physical cables. In some embodiments, Bluetooth and USB interfaces may also be included for short-range wireless communication and direct data transfer, respectively. The communication interface 148 may transmit the processed data from the DSP to external systems for further analysis, reporting, or storage. After the DSP processes the signals received from the ADC and extracts meaningful information about the target materials, the control panel 146 may package this data into suitable formats, such as JSON or XML. The communication interface 148 may then send this data over the network to a remote server or database, where it can be accessed by operators, analysts, or automated systems for further decision-making. In some embodiments, the communication interface 148 may provide remote monitoring and control of the RF detection device 102. Operators may use a web-based interface or a mobile application to access real-time status updates, view detection logs, and adjust configuration settings. For example, if the RF detection device 102 needs to be calibrated for a new target material, the configuration updates can be sent remotely through the communication interface 148, minimizing the need for on-site adjustments. In some embodiments, the communication interface 148 may support alerting and notification functionalities. When the control panel 146 detects the presence of target materials, it can use the communication interface 148 to send immediate alerts to designated personnel via email, SMS, or push notifications.

Further, embodiments may include a user interface 150, which may be a graphical and interactive interface that enables users to control, monitor, and interact with the RF detection device 102 functionalities. The user interface 150 may provide a means for selecting target materials, configuring operational parameters, initiating the detection process, and receiving real-time feedback and analysis results. In some embodiments, the user interface 150 may include visual indicators, control buttons, data visualization tools, and user guidance components to facilitate efficient and accurate detection and analysis of specific materials. In some embodiments, the user interface 150 may display notifications, alerts, messages, etc., to inform the user or operator of detected target materials, analysis of the detected target material, etc.

Further, embodiments may include a processor 152, which may be responsible for executing instructions from programs and controlling the operation of other hardware components. The processor 152 may perform basic arithmetic, logic, control, and input/output (I/O) operations specified by the instructions in the programs. The processor 152 may operate by fetching instructions from memory 154, decoding them to determine the required operation, executing the operations, and then storing the results. In some embodiments, the processor 152 may coordinate the overall system operations, manage communication between subsystems, and handle complex data analysis tasks that complement the real-time signal processing performed by the DSP. For example, when the RF detection device 102 is powered on, the processor 152 may initiate a boot-up sequence that includes running diagnostics to check the status of all subsystems, such as the transmitter unit 106, the receiver unit 124, and control panel 146. During this initialization phase, the processor 152 may ensure that each component receives the correct voltage and current levels required for operation. The processor 152 may also load predefined detection configurations and communicate with the transmitter unit 106 and receiver unit 124 to configure their operating parameters based on the target material. In some embodiments, the processor 152 may handle user interface 150 tasks, displaying system status indicators and receiving user inputs. The processor 152 may ensure that the control panel 146 provides real-time feedback, such as green LED indicators for successful power-up and system readiness. In some embodiments, the processor 152 may manage data storage and logging, recording detection events and system performance metrics for future analysis.

Further, embodiments may include a memory 154, which may include suitable logic, circuitry, and/or interfaces that may be configured to store a machine code and/or a computer program with at least one code section executable by the processor 152. Examples of implementation of the memory 154 may include, but are not limited to, fixed (hard) drives, magnetic tape, floppy diskettes, optical disks, Compact Disc Read-Only Memories (CD-ROMs), and magneto-optical disks, semiconductor memories, such as ROMs, Random Access Memories (RAMs), Programmable Read-Only Memories (PROMs), Erasable PROMs (EPROMs), Electrically Erasable PROMs (EEPROMs), flash memory, magnetic or optical cards, or other type of media/machine-readable medium suitable for storing electronic instructions. In some embodiments, the memory 154 may store configuration settings, signal patterns, and detection algorithms.

Further, embodiments may include a base module 156, which begins with the system 100 being activated, and the base module 156 connecting to the detection network 172. The base module 156 sends a request for the material data stored in the detection network 172 and receives the material data. The base module 156 stores the received data in the specific material database 164. The user inputs the target material. The base module 156 compares the inputted target material to the specific material database 164 and extracts the target material parameters. The base module 156 sends the target material parameters to the detection module 158. The base module 156 initiates the detection module 158 and the AI module 160.

Further, embodiments may include a detection module 158, which begins by being initiated by the base module 156. The detection module 158 receives the target material parameters from the base module 156 and selects the first parameter setting. The detection module 158 commands the transmitter unit 106 to configure the transmit signal and to generate the transmit signal via the transmit antenna 120. The detection module 158 commands the receiver unit 124 to receive the RF signal via receiver antenna 126 and to process the RF signal. The detection module 158 stores the processed data in the detection database 166. The detection module 158 determines if more parameter settings are remaining. If it is determined that more parameter settings are remaining, the detection module 158 selects the next parameter setting, and the process returns to configuring the RF transmit signal. If it is determined that no more parameter settings are remaining the detection module 158 returns to the base module 156.

Further, embodiments may include an AI module 160, which begins by being initiated by the base module 156. The AI module 160 extracts the data stored in the detection database 166. The AI module 160 performs the AI algorithm to determine the quantity and distance of the detected target material. The AI module 160 sends the output of the AI algorithm to the user interface 150 and stores the output data in the upload database 168. The AI module 160 initiates the upload module 162 and returns to the base module 156.

Further, embodiments may include an upload module 162, which begins by being initiated by the base module 156 and connects to the detection network 172. The upload module 162 extracts the data stored in the upload database 168 and sends the extracted data to the detection network 172. The upload module 162 returns to the AI module 160.

Further, embodiments may contain a specific material database 164, which may contain the data from the network material database 180, allowing the RF detection device 102 to compare new detection data against the unique material profiles. The specific material database 164 may contain a unique material profile derived from clustering similar detection events. The profiles may include the transmit frequency, which indicates the optimal frequency for detecting the material, and the corresponding transmit power level. The response frequency represents the frequency of the signal reflected back from the target material, while the response signal strength indicates the intensity of this returned signal. In some embodiments, environmental factors may be stored to provide context for the detection conditions. The specific material database 164 may include information on the relationship between the response signal strength and the known quantities and distances of the material from historical data, allowing the specific material database 164 to determine the quantity and distance of the target material during new detection events. For example, a stronger response signal might indicate a larger quantity of material or a closer distance, and these relationships may be mapped out in the specific material database 164. The RF detection devices 102 may utilize this pre-trained specific material database 164 by comparing new detection data against the stored profiles. In some embodiments, the pre-trained specific material database 164 may be a pre-trained model, such as a model for pre-trained neural network, and comparing the detection data against the stored profiles may include providing inputs to an input layer of the pre-trained model to obtain an output, such as whether a target material has been detected. When a detection event occurs, the RF detection device 102 matches the real-time data with the closest profiles in the database, allowing it to accurately identify the material. By analyzing the matched profile's signal strength patterns, the device can estimate the quantity of the material and determine its distance.

Further, embodiments may include a detection database 166, which may be created from the process described in the detection module 158. The detection module 158 may contain the processed data, including the target material, the frequency and power levels for the parameter setting, the response signal data, including frequency and signal strength, if the target material was detected, etc. In some embodiments, the detection module 158 may store environmental data, geolocation of the RF detection device 102, timestamp data, etc. In some embodiments, the detection database 166 may contain a plurality of data entries that relate to each one of the target material parameters that was used to detect the target material.

Further, embodiments may include an upload database 168, which may be created in the process described in the AI module 160 that stores the output of the AI algorithm. The upload database 168 may contain the data from a detection event from the RF detection devices 102, such as the transmit signal parameters such as frequency and power levels, response signal characteristics including frequency and signal strength, the quantity and distance of the target material, and contextual environmental conditions like temperature and humidity. In some embodiments, geolocation data may be included to store the precise latitude and longitude of both the detection device and the target material and may include a timestamp indicating the exact time and date of the detection.

Further, embodiments may include a cloud 170, or communication network, which may be a wired and/or wireless network. The communication network, if wireless, may be implemented using communication techniques such as Visible Light Communication (VLC), Worldwide Interoperability for Microwave Access (WiMAX), Long Term Evolution (LTE), Wireless Local Area Network (WLAN), Infrared (IR) communication, Public Switched Telephone Network (PSTN), Radio waves, and other communication techniques known in the art. The communication network may allow ubiquitous access to shared pools of configurable system resources and higher-level services that can be rapidly provisioned with minimal management effort, often over the Internet, and relies on the sharing of resources to achieve coherence and economies of scale, like a public utility, while third-party clouds 170 enable organizations to focus on their core businesses instead of expending resources on computer infrastructure and maintenance.

Further, embodiments may include a detection network 172, which may be a collection of interconnected devices that communicate with each other to share resources, data, and applications. In some embodiments, the detection network 172 may utilize various protocols, such as TCP/IP, to ensure data is transmitted accurately and efficiently. In some embodiments, the detection network 172 may transmit the pre-trained network material database 180 to the RF detection devices, allowing the devices to accurately detect a target material and determine the quantity and distance. The detection network 172 may be designed to support real-time data transmission, remote monitoring, and analysis functionalities, ensuring that the system 100 operates efficiently and effectively.

Further, embodiments may include a data collection module 174, which begins by connecting to the RF detection device 102. The data collection module 174 continuously polls for the upload data from the upload module 162 and then receives the upload data. The data collection module 174 stores the data in the update database 182 and the process returns to connecting to the RF detection device 102.

Further, embodiments may include a learning module 176, which begins by being initiated by the operator via the user device 186. The learning module 176 extracts the data from the historical database 184 and performs the training algorithm to create the network material database 180. The learning module 176 stores the output in the network material database 180. The learning module 176 queries the update database 182 for a new data entry and extracts the new data entry from the update database. The learning module 176 updates the network material database 180, and the process returns to querying the update database 182 for a new data entry.

Further, embodiments may include an update module 178, which begins by connecting to the RF detection device 102. The update module 178 continuously polls and receives a request from the base module 156 for the data in the network material database 180. The update module 178 sends the data to the network material database 180, and the process returns to connecting to the RF detection device 102.

Further, embodiments may include a network material database 180, which may be created by the training algorithm that uses historical data to identify patterns and relationships. The network material database 180 may contain a unique material profile, derived from clustering similar detection events. The profiles may include the transmit frequency, which indicates the optimal frequency for detecting the material, and the corresponding transmit power level. The response frequency represents the frequency of the signal reflected back from the target material, while the response signal strength indicates the intensity of this returned signal. In some embodiments, environmental factors may be recorded to provide context for the detection conditions. The network material database 180 may include information on the relationship between the response signal strength and the known quantities and distances of the material from historical data, allowing the database to infer the quantity and distance of the target material during new detection events. For example, a stronger response signal might indicate a larger quantity of material or a closer distance, and these relationships are meticulously mapped out in the database. The RF detection devices 102 may utilize this pre-trained network material database 180 by comparing new detection data against the stored profiles. When a detection event occurs, the RF detection device 102 matches the real-time data with the closest profiles in the database, allowing it to accurately identify the material. By analyzing the matched profile's signal strength patterns, the device can estimate the quantity of the material and determine its distance.

Further, embodiments may include an update database 182, which may be created from the process described in the data collection module 174. The update database 184 may contain the data from a detection event from the RF detection devices 102, such as the transmit signal parameters such as frequency and power levels, response signal characteristics including frequency and signal strength, the quantity and distance of the target material, and contextual environmental conditions like temperature and humidity. In some embodiments, geolocation data may be included to store the precise latitude and longitude of both the detection device and the target material and may include a timestamp indicating the exact time and date of the detection.

Further, embodiments may include a historical database 184, which may contain data collected from multiple RF detection devices 102 deployed in various environments. In some embodiments, the data originates from the RF detection devices' 102 frequent field operations, where they record interactions with different materials. The historical database 184 may contain detailed logs of transmit signal parameters, such as frequency and power levels, as well as response signal characteristics, such as frequency and signal strength. In some embodiments, the historical database 184 may include contextual information, such as environmental factors, for example, temperature, humidity, etc., geolocation coordinates, for example, latitude and longitude, of both the detection event and the target material, and timestamps for each detection event. Each entry in the historical database 184 may represent a data point captured during a detection event. The data points may contain the transmit frequency, which is the frequency at which the RF signal was transmitted, and the transmit power level, indicating the signal's strength. The response frequency denotes the frequency of the signal reflected back from the target material, while the response signal strength measures the intensity of this returned signal. In some embodiments, environmental factors may also be stored to provide context for the detection conditions, including temperature and humidity levels at the time of detection. In some embodiments, geolocation data may specify the exact location of the detection event and the target material, and the timestamp may record the precise time and date. The historical database 184 may be used for the training and refinement of the training model. By analyzing patterns and relationships within this data, the models may learn to identify specific materials based on their unique electromagnetic signatures. For example, the database enables the clustering of similar detection events, helping to classify materials with similar response patterns. These clusters are then used to create a pre-trained network material database 180, which the RF detection devices 102 may reference in real time to compare new detections against historical data. This comparison allows the RF detection devices 102 to accurately determine the type, quantity, distance, and location of detected materials, significantly enhancing their detection capabilities.

Further, embodiments may include a user device 186, which may be an electronic device that provides an interface for users to interact with applications, data, and other digital services. In some embodiments, user devices 186 may include desktop computers, laptops, tablets, and smartphones to specialized equipment like industrial handhelds or medical diagnostic tools. In some embodiments, the user device 186 may include input mechanisms, such as keyboards, touchscreens, etc., and output displays, such as screens, processing capabilities, storage, and connectivity options. The user device 186 may enable operators to view and analyze the data collected by the RF detection device 102 or the detection network 172. In some embodiments, the user device 186 may act as an interface through which operators receive real-time updates, visualize data, and make informed decisions based on the detected signals. In some embodiments, the user device 186 may connect to the detection network 172, where RF detection data is stored and processed. In some embodiments, the user device 186 may include a high-resolution display screen that presents data visualizations, such as graphs, charts, and maps, allowing operators to quickly interpret the detection results. In some embodiments, the user device 186 may include various connectivity options such as Wi-Fi, Ethernet, Bluetooth, and cellular networks to ensure reliable communication with the RF detection devices 102, detection network 172, and remote servers. In some embodiments, the user device 186 may include interactive dashboards, customizable alerts, and detailed logs of detection events. For example, an operator may use the interface to set thresholds for alerts, view historical data trends, and configure the detection parameters remotely.

In another embodiment, a material detection system uses a hybrid antenna that can operate both in RF-based and magnetic-based detection modes. This system is capable of switching between detecting materials based on their interaction with the RF field or the magnetic field, depending on the material being analyzed. In RF mode, the antenna transmits RF waves, and the system analyzes how the material reflects or absorbs these waves, providing information based on the dielectric constant or conductive properties of the material. In magnetic mode, the antenna focuses on the interaction between the material and the magnetic field component of the electromagnetic wave, allowing detection of materials with high magnetic permeability or strong magnetic responses. For example, the system could be used to detect metallic substances or magnetic compounds, such as those found in explosive materials, by optimizing the detection process based on which field interaction yields the clearest signature.

In yet another embodiment, a near-field material detection system uses a magnetic-based loop antenna that focuses on magnetic field interaction within close proximity to the target material. This system uses magnetic resonance principles, detecting changes in the magnetic field due to interactions with materials possessing magnetic susceptibility, such as ferromagnetic metals. The loop antenna generates a localized oscillating magnetic field, and when materials are introduced into the detection zone, they alter the field by inducing eddy currents or magnetic resonance effects. These changes are then measured to determine the material's properties. This method is particularly useful in applications such as industrial quality control or close-range security screening, where detecting the magnetic characteristics of a material offers clear advantages.

In still another embodiment, far-field magnetic resonance techniques are employed for material detection at greater distances. This system operates by transmitting an electromagnetic wave where the magnetic field component is emphasized, focusing on its interaction with materials that have resonant magnetic properties. By tuning the system to specific resonant frequencies, materials that exhibit strong magnetic responses, such as certain alloys or ferromagnetic materials, can be detected over a larger range. The detection system then analyzes the phase or amplitude of the reflected wave to infer material characteristics. This embodiment is particularly suitable for remote sensing applications, such as geological surveys, where materials can be identified based on their magnetic resonance even when located at a distance from the detection apparatus.

In other embodiments, an array of antennas is used to simultaneously detect materials based on both RF and magnetic field interactions. The antenna array consists of dipole antennas optimized for detecting the electric component of the RF wave and loop antennas that focus on the magnetic field interaction. These two types of signals are combined to create a composite material signature, allowing for detailed analysis of both the dielectric and magnetic properties of the material. By processing both electric and magnetic field data, the system can more accurately identify materials that exhibit a combination of electrical conductivity and magnetic permeability, such as advanced composites or stealth materials. This dual-mode system can be particularly useful in defense or aerospace applications.

In still other embodiments, a magnetic-based antenna system is designed for material detection in environments where RF signals would typically be degraded, such as underground or underwater. This system uses a loop antenna to generate a magnetic field that interacts with materials possessing strong magnetic properties, even in situations where RF signals are heavily attenuated. The antenna detects variations in the magnetic field caused by materials with high permeability, such as iron or nickel-based substances. This method allows for the detection of magnetic materials in conditions where RF detection would be unreliable, such as in deep-sea exploration or subterranean mining operations, where conventional RF signals would fail to penetrate effectively.

In further embodiments, a phased array system is designed specifically to manipulate the magnetic component of the electromagnetic wave for high-resolution material detection. A phased array of loop antennas is used to steer and focus the magnetic field, creating a directed magnetic beam that can scan across a target area. The system detects materials based on how they alter the magnetic field, allowing for precise location and identification of magnetic objects. By adjusting the phase and amplitude of each antenna element, the system provides a fine degree of control, enabling highly localized material detection. This approach is useful in situations requiring detailed spatial resolution, such as identifying hidden metallic objects in security screening or detailed inspections in industrial settings.

In additional embodiments, a portable or wearable material detection system is implemented using a small, magnetic-based loop antenna for detecting magnetic materials in close proximity. This compact system allows security personnel or industrial workers to move through different environments while continuously monitoring for materials that exhibit magnetic properties. The loop antenna generates a localized magnetic field and detects perturbations caused by nearby magnetic materials, such as concealed weapons or magnetic tags. The system then alerts the user when such materials are detected, making it ideal for field operations where mobility and ease of use are critical.

In yet another embodiment, the material detection system is entirely RF-based, using a highly optimized RF antenna to detect materials based solely on their interaction with the RF field. The RF antenna transmits electromagnetic waves at specific frequencies, and the system analyzes how these waves are reflected, absorbed, or scattered by the material. By focusing on the dielectric constant or conductive properties of the target material, the system can accurately identify substances such as explosives, chemicals, or other dielectric materials. This approach is particularly effective in environments where magnetic field-based detection is unnecessary or less effective. The RF-based system can be adapted for wide-ranging applications, from industrial material testing to security scanning, where detecting the electrical characteristics of the material is sufficient for identification.

Figure 2:
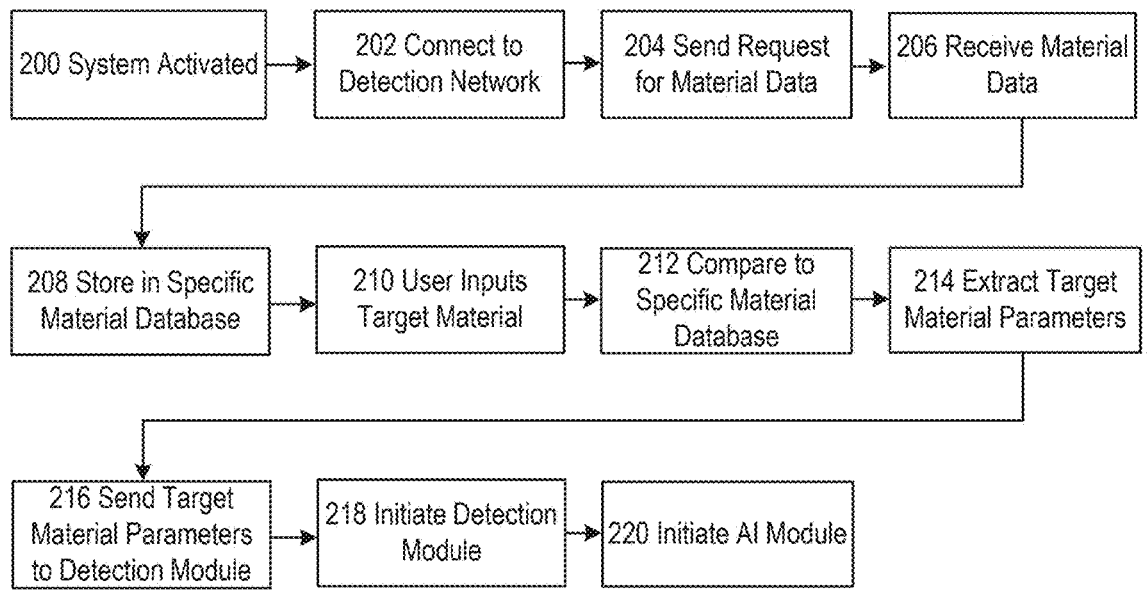
FIG. 2 is a flow chart of a method performed by a Base Module, according to an embodiment.

FIG. 2 is a flow chart of a method performed by the base module 156. The process begins with the system being activated, at step 200. The system may be activated by an operator or user, for example powering on the RF detection device 102. The base module 156 connects, at step 202, to the detection network 172. The base module 156 may connect to the detection network 172 through the cloud 170 via the communication interface 148. The base module 156 sends, at step 204, a request for the material data stored in the detection network 172. In some embodiments, the base module 156 may send a version ID that relates to the version of the pre-trained network material database 180 currently operating on the RF detection device 102. If the update module 178 determines that there is a newer version, the update module 178 sends the updated network material database 180. The base module 156 receives, at step 206, the material data stored in the detection network 172. The base module 156 may receive the data stored in the pre-trained network material database 180, allowing the RF detection device 102 to compare new detection data against the unique material profiles. When a detection event occurs, the RF detection device 102 matches the real-time data with the closest profiles, allowing it to accurately identify the material. By analyzing the matched profile's signal strength patterns, the device can estimate the quantity of the material and determine its distance. The base module 156 stores, at step 208, the received data in the specific material database 164. The specific material database 164 may contain a unique material profile, derived from clustering similar detection events. The profiles may include the transmit frequency, which indicates the optimal frequency for detecting the material, and the corresponding transmit power level. The response frequency represents the frequency of the signal reflected back from the target material, while the response signal strength indicates the intensity of this returned signal. In some embodiments, environmental factors may be stored to provide context for the detection conditions. The specific material database 180 may include information on the relationship between the response signal strength and the known quantities and distances of the material from historical data, allowing the specific material database 164 to determine the quantity and distance of the target material during new detection events. For example, a stronger response signal might indicate a larger quantity of material or a closer distance, and these relationships may be mapped out in the specific material database 164. The RF detection devices 102 may utilize this pre-trained specific material database 164 by comparing new detection data against the stored profiles. When a detection event occurs, the RF detection device 102 matches the real-time data with the closest profiles in the database, allowing it to accurately identify the material. By analyzing the matched profile's signal strength patterns, the device can estimate the quantity of the material and determine its distance. The user inputs, at step 210, the target material. In some embodiments, the user may input the desired target material through the user interface 150. The base module 156 compares, at step 212, the inputted target material to the specific material database 164. The base module 156 may compare the inputted target material to determine the optimal target material parameters, such as the transmit parameters, including frequency and power levels. The base module 156 extracts, at step 214, the target material parameters. The base module 156 may extract the optimal target material parameters, such as the transmit parameters, including frequency and power levels. The base module 156 sends, at step 216, the target material parameters to the detection module 158. In some embodiments, the base module 156 may send the parameters, which may include a plurality of frequencies and power levels for an individual target material. In some embodiments, the detection module 158 may be required to transmit and receive a specific number of signals to ensure that the detection, quantity, and distance results are accurate. The base module 156 initiates, at step 218, the detection module 158. The detection module 158 begins by being initiated by the base module 156. The detection module 158 receives the target material parameters from the base module 156 and selects the first parameter setting. The detection module 158 commands the transmitter unit 106 to configure the transmit signal and to generate the transmit signal via the transmit antenna 120. The detection module 158 commands the receiver unit 124 to receive the RF signal via receiver antenna 126 and to process the RF signal. The detection module 158 stores the processed data in the detection database 166. The detection module 158 determines if more parameter settings are remaining. If it is determined that more parameter settings are remaining the detection module 158 selects the next parameter setting, and the process returns to configuring the RF transmit signal. If it is determined that no more parameter settings are remaining the detection module 158 returns to the base module 156. The base module 156 initiates, at step 220, the AI module 160. The AI module 160 begins by being initiated by the base module 156. The AI module 160 extracts the data stored in the detection database 166. The AI module 160 performs the AI algorithm to determine the quantity and distance of the detected target material. The AI module 160 sends the output of the AI algorithm to the user interface 150 and stores the output data in the upload database 168. The AI module 160 initiates the upload module 162 and returns to the base module 156.

Figure 3:
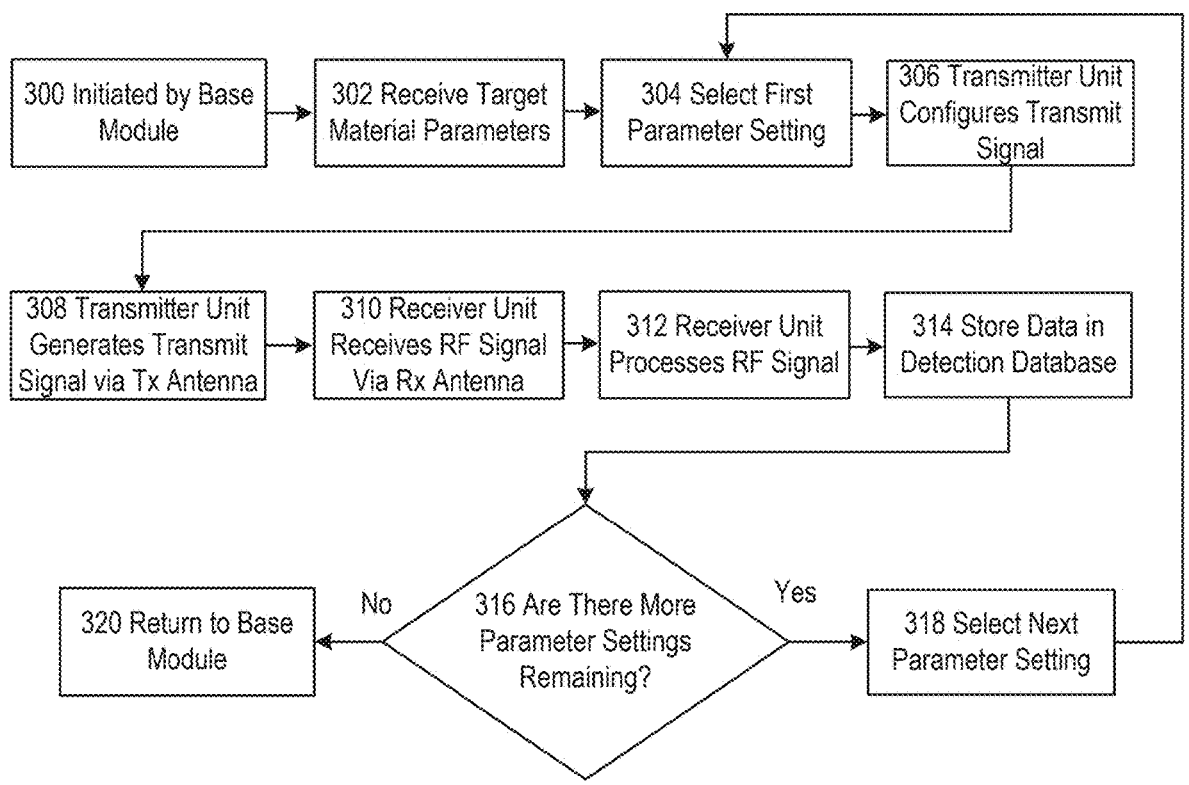
FIG. 3 is a flow chart of a method performed by a Detection Module, according to an embodiment.

FIG. 3 is a flow chart of a method performed by the detection module 158. The process begins with the detection module 158 being initiated, at step 300, by the base module 156. The detection module 158 receives, at step 302, the target material parameters from the base module 156. In some embodiments, the detection module 158 may receive the parameters, which may include a plurality of frequencies and power levels for an individual target material. In some embodiments, the detection module 158 may be required to transmit and receive multiple signals to ensure that the detection, quantity, and distance results are accurate. The detection module 158 selects, at step 304, the first parameter setting. The frequency may be based on the atomic structure of the target material. For example, the selected frequencies for Arsenic (As) would be 33 Hz, based on the number of protons, 42 Hz, based on number of neutrons, and 75 Hz, based on atomic mass. These frequencies can also be increased by one or more orders of magnitude, such as 10×, 100×, etc. Similarly, the frequencies for a compound can be selected based on the sum total of the constituent parts. For example, a Formaldehyde molecule has a combined total of 16 protons, corresponding to a frequency of 16 Hz, 14 neutrons, corresponding to a frequency of 14 Hz, and a mass of 30, corresponding to a frequency of 30 Hz. Individual scans using two or more of these frequencies can be used to uniquely identify the element or compound. In some embodiments, a frequency is selected for a particular element based on the sum of the number of protons and atomic mass, such as the sum of protons and neutrons, for the element. For example, the selected frequency for Arsenic (As) would be 108 Hz based on the addition of 33 protons, with 75 atomic mass. This frequency can also be increased by one or more orders of magnitude, such as 10×, 100×, etc. Similarly, the frequency for a compound can be selected based on the sum total of the constituent parts. For example, a Formaldehyde molecule has a combined total of 16 protons and a mass of 30. The corresponding frequency would be 46 Hz, addition of 16 protons with 30 mass. As another example, smokeless gunpowder would yield a base transmit frequency of 1160. The tuning frequency of 1160 Hz is derived from the chemical composition, discrete atomic structure, CH2NO3CHNO3CH2NO3 for nitroglycerin. By using the atomic number, or the number of protons for each as element, the frequency is calculated 6+(1*2)+7+(8*3)+6+1+7+(8*3)+6+(1*2)+7+(8*3) which yields a sum of 116 protons in the compound. This is then increased by an order of magnitude, such as 10×, yielding 1160 Hz as the frequency to search for nitroglycerin. In some embodiments, some elements and compounds may have overlapping frequencies using one of the methods described above, and it may be beneficial to use multiple of the above-described methods when searching for or identifying a target material. The detection module 158 commands, at step 306, the transmitter unit 106 to configure the transmit signal. The transmitter unit 106 prepares the signal that will be transmitted for the purpose of detecting a target material. In some embodiments, the parameters and components may be set up with the desired characteristics to generate the RF signal. The control panel 146 determines the specific parameters of the RF signal that need to be generated. The parameters may include the frequency, amplitude, and modulation type required to effectively detect the target materials. Once the parameters are set, the control panel 146 sends a command to activate the oscillator circuit 108 within the transmitter unit 106. The oscillator circuit 108 may be responsible for generating a stable RF signal at the desired frequency and may consist of components like capacitors, inductors, and amplifiers that work together to create the oscillating signal. The power delivery to the oscillator circuit 108 may be managed by the SCR 114. When the control panel 146 sends a gate signal to the SCR 114, it switches from a non-conductive to a conductive state, allowing current from the power source, such as batteries, to flow to the oscillator circuit 108. After the oscillator circuit 108 generates the RF signal, the transformer 116 adjusts the voltage level of the signal to match the requirements of the transmit antenna 120. It may also provide impedance matching to ensure efficient signal transmission. The transformer 116 ensures that the RF signal is at the appropriate voltage and current levels for optimal transmission. For example, the control panel 146 may determine that an RF signal with a frequency of 50 Hz is required to detect a specific material. It sends a command to the transmitter unit 106 to configure this signal. The oscillator circuit 108 is activated, generating an RF signal at 50 Hz. The SCR 114 is triggered, allowing power from the batteries 122 to flow to the oscillator circuit 108. The generated signal is then conditioned by the transformer 116, ensuring it is at the correct voltage level for transmission. The detection module 158 commands, at step 308, the transmitter unit 106 to generate the transmit signal via the transmit antenna 120. The transmitter unit 106 generates the RF signal and transmits it through the transmit antenna 120 by converting electrical energy into radio waves that can be used for detecting specific materials. The transmit antenna 120 radiates the RF signal into the environment. The radio waves propagate through the medium, such as air or ground, and interact with the target materials. The interaction between the RF signal and the target materials will produce detectable changes in the signal, which can be received and analyzed by the receiver unit 124. For example, the transmitter unit 106 generates a wave pulse at a specified frequency that is transmitted directionally into the ground. The generated frequency is closely approximate or exact to that of the target material, and that relationship creates a responsive RF wave and/or a magnetic line between the transmitter antenna 120 and the target. When the RF detection device 102 is aligned with a target material, for example, when the opening of the directional shield 142 is pointing toward the target material, the voltage produced by the receiver antenna 126 changes and thereby produces a detection output signal, such as an audio signal having a tone different than that of the baseline. A reflective wave is produced by the target material that amplifies, resonates, offsets, or otherwise modifies the magnetic field passing through the receiver antenna 126 to alter the voltage produced, thereby generating the output signal. The receiver antenna 126 is responding to a voltage increase from the transmitter antenna 120 swinging over the magnetic line to the material. The detection module 158 commands, at step 310, the receiver unit 124 to receive RF signal via receiver antenna 126. The receiver unit 124 captures the RF signal that has interacted with the environment and potential target materials using the receiver antenna 126. The receiver antenna 126 captures the incoming RF signal, which has been transmitted by the transmitter unit 106 and has interacted with the environment and any target materials present. The receiver antenna 126 may be designed to effectively capture these radio waves and convert them back into electrical signals. Once the RF signal is received by the antenna, it may be fed into an RF amplifier, which boosts the signal strength without significantly altering its characteristics. In some embodiments, the use of the standard atomic structure of a material may be used to calculate the resonant frequency to which a particular substance would generate or respond. Each element and compound comprises a definable atomic structure composed of the total number of protons and neutrons of that target material. This unique nuclear composition of every substance makes it uniquely identifiable and detectable. The manner in which this information is applied thus enables the detection of any target substance. A target material can be detected and located based on a resonant, responsive RF wave and/or magnetic relationship between the target and a transmitter antenna 120 transmitting at the frequency specific and unique to the target material. The transmitter unit 106, through the transmitter antenna 120, induces a resonance due to responsive RF waves and/or magnetic and/or otherwise, in a targeted material to resonate at a specific computed frequency. The receiver antenna 126 and receiver circuit 128 detect the resonance induced in the material and, in so doing, indicate the approximate line of bearing to the material. The primary method used by this detection system to detect specific materials is based on tuning the circuit 108 of the transmitter unit 106 to a specific value that is computed for the material of interest. The frequency can be based on any of the three defining characteristics of the substance, the number of protons, the number of neutrons, or the atomic mass, such as the sum of protons and neutrons and combinations thereof. The frequency can be transmitted at varying voltages to compensate for other external effects or interference. In some embodiments, a table or database of characteristics of common materials may be used to calculate the resonant frequencies. To accomplish this tuning, the frequency of the signal from the transmitter antenna 120 is set to some harmonic of the elements of the material. The detection module 158 commands, at step 312, the receiver unit 124 to process the RF signal. The receiver unit 124 processes the received RF signal to extract meaningful data that can be analyzed for the presence of specific materials, which may involve further amplification, filtering, digitization, and initial data processing before the signal is sent to the control panel 146 for detailed analysis. In some embodiments, after the RF signal is received and initially amplified, it may require further amplification to ensure the signal is at an optimal level for processing. In some embodiments, an additional RF amplifier within the receiver unit 124 may boost the signal strength while maintaining its integrity. The amplified signal may be subjected to more advanced filtering by the filter circuit, which removes any residual noise and unwanted frequencies that might have passed through the initial filtering stage. In some embodiments, the filtering may involve bandpass filters that allow only the desired frequency range to pass through. The filtered analog signal may be converted into a digital format using an Analog-to-Digital Converter, ADC. The ADC samples the analog signal at a high rate and converts it into a series of digital values. The digitized signal may be processed using digital techniques. The digital signal may be fed into a Digital Signal Processor, DSP, within the receiver unit 124. In some embodiments, the DSP may perform initial data processing tasks such as demodulation, noise reduction, and feature extraction. Demodulation involves extracting the original information-bearing signal from the carrier wave. Noise reduction techniques may further clean the signal, making it easier to analyze. Feature extraction may involve identifying characteristics of the signal that are indicative of the presence of target materials. The detection module 158 stores, at step 314, the processed data in the detection database 166.

The detection module 158 may store the processed data, including the target material, the frequency and power levels for the parameter setting, the response signal data, including frequency and signal strength if the target material was detected, etc. In some embodiments, the detection module 158 may store environmental data, geolocation of the RF detection device 102, timestamp data, etc. The detection module 158 determines, at step 316, if more parameter settings are remaining. The detection module 158 may continue the detection process for all of the target material parameters received from the base module 158. If it is determined that more parameter settings are remaining, the detection module 158 selects, at step 318, the next parameter setting, and the process returns to configuring the RF transmit signal. If it is determined that no more parameter settings are remaining the detection module 158 returns, at step 320, to the base module 156.

Figure 4:
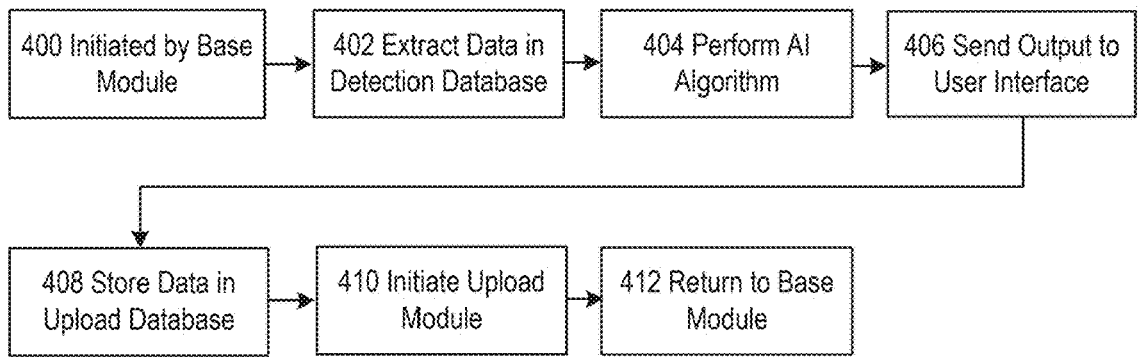
FIG. 4 is a flow chart of a method performed by an AI Module, according to an embodiment.

FIG. 4 is a flow chart of a method performed by the AI module 160. The process begins with the AI module 160 being initiated, at step 400, by the base module 156. The AI module 160 extracts, at step 402, the data stored in the detection database 166. The detection module 158 may contain the processed data, including the target material, the frequency and power levels for the parameter setting, the response signal data, including frequency and signal strength, if the target material was detected, etc. In some embodiments, the detection module 158 may store environmental data, geolocation of the RF detection device 102, timestamp data, etc. In some embodiments, the detection database 166 may contain a plurality of data entries that relate to each one of the target material parameters that was used to detect the target material. The AI module 160 performs, at step 404, the AI algorithm to determine the quantity and distance of the detected target material. For example, the AI algorithm may be a supervised learning process involving regression analysis, combined with signal processing techniques. The AI algorithm may begin by using the pre-trained specific material database 164, which contains historical data on various materials, their response signals at different frequencies and power levels, and the corresponding quantities and distances. The AI algorithm may preprocess the extracted data from the detection database 166 to ensure consistency and accuracy, such as normalization of the signal strength, frequency, and power level data to match the scale of the historical data. The extracted data may be inputted into an AI algorithm that may be trained to predict both the quantity and distance of the target material. The AI algorithm may be a multi-output regression model, such as a Random Forest Regressor, Gradient Boosting Regressor, or a deep learning-based model like a neural network with multiple output layers. The AI algorithm may use features extracted from the detection data, including the frequencies, power levels, and signal strengths of the received RF signals. In some embodiments, The AI algorithm may incorporate environmental factors like temperature and humidity, which might affect signal propagation and response. The AI algorithm may be trained on the historical data from the pre-trained specific material database 164 to learn the relationships between the input features and the target variables, for example, quantity and distance. For example, the AI algorithm may be trained on a dataset where the input features include the frequency, such as 1160 Hz, power level, such as 320 V, and signal strength, such as 65 dB, along with environmental conditions and geolocation data. The target variables would be the known quantity and distance of the detected materials from historical records. Once the AI algorithm is trained, it can be used to predict the quantity and distance of the target material in new detection scenarios. The process may involve feeding the new detection data into the trained model, which then outputs the estimated quantity and distance. This prediction is based on the learned patterns and correlations in the historical data. To ensure high accuracy, the AI algorithm may use ensemble learning techniques, where multiple models are trained, and their predictions are combined to produce a reliable output. In some embodiments, the system may employ cross-validation techniques during training to validate the model's performance and prevent overfitting. For example, if the RF detection device 102 detects a target material with a response signal of 1160 Hz frequency, 320 V power level, and 65 dB signal strength. The AI algorithm would compare this data against the pre-trained specific material database 164, using the AI algorithm to predict that the detected material is 2 kg of a specific substance located 150 meters away from the device. The AI module 160 sends, at step 406, the output of the AI algorithm to the user interface 150. The AI module 160 may send the target material, the distance about the RF detection device 102, and the quantity to the user interface 150. The AI module 160 stores, at step 408, the output data in the upload database 168. The upload database 168 may contain the data from a detection event from the RF detection devices 102, such as the transmit signal parameters such as frequency and power levels, response signal characteristics including frequency and signal strength, the quantity and distance of the target material, and contextual environmental conditions like temperature and humidity. In some embodiments, geolocation data may be included to store the precise latitude and longitude of both the detection device and the target material and may include a timestamp indicating the exact time and date of the detection. Other variables that may be considered include variations in material composition across different samples, which may affect resonance and signal strength. Calibration data from the RF detection device could be incorporated to adjust predictions based on device-specific performance characteristics. Trends over time from collected data may be analyzed to predict changes in material characteristics or environmental conditions. The decay patterns of signal strength over distance or through different mediums could be considered to improve the accuracy of distance estimations. The presence and influence of other nearby materials which might alter the RF signal characteristics may also be factored in. The AI module 160 initiates, at step 410, the upload module 162. The upload module 162 begins by being initiated by the base module 156 and connects to the detection network 172. The upload module 162 extracts the data stored in the upload database 168 and sends the extracted data to the detection network 172. The upload module 162 returns to the AI module 160. The AI module 160 returns, at step 412, to the base module 156.

Figure 5:
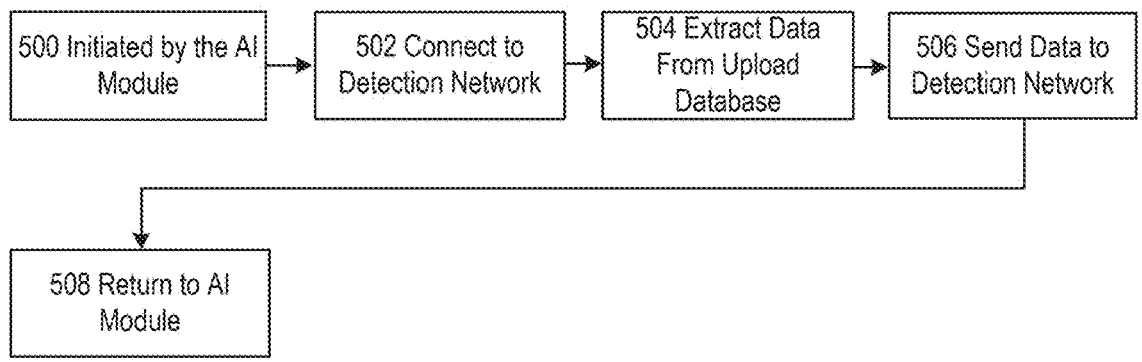
FIG. 5 is a flow chart of a method performed by an Upload Module, according to an embodiment.

FIG. 5 is a flow chart of a method performed by the upload module 162. The process begins with the upload module 162 being initiated, at step 500, by the base module 156. The upload module 162 connects, at step 502, to the detection network 172. The upload module 162 may connect to the detection network 172, and the data collection module 174 through the cloud 170 via the communication interface 148. In some embodiments, the upload module 162 may continuously query the upload database 168 for a new data entry, and once the data entry is stored, the upload module 162 connects to the detection network 172 to send the upload data of the new detection event and results of the AI algorithm. The upload module 162 extracts, at step 504, the data stored in the upload database 168. The upload database 168 may contain the data from a detection event from the RF detection devices 102, such as the transmit signal parameters such as frequency and power levels, response signal characteristics including frequency and signal strength, the quantity and distance of the target material, and contextual environmental conditions like temperature and humidity. In some embodiments, geolocation data may be included to store the precise latitude and longitude of both the detection device and the target material and may include a timestamp indicating the exact time and date of the detection. The upload module 162 sends, at step 506, the extracted data to the detection network 172. The upload module 162 sends the output of the AI algorithm, the transmit parameters used, and the response signal data received from the new detection event to the data collection module 174. The upload module 162 returns, at step 508, to the AI module 160.

Figure 6:
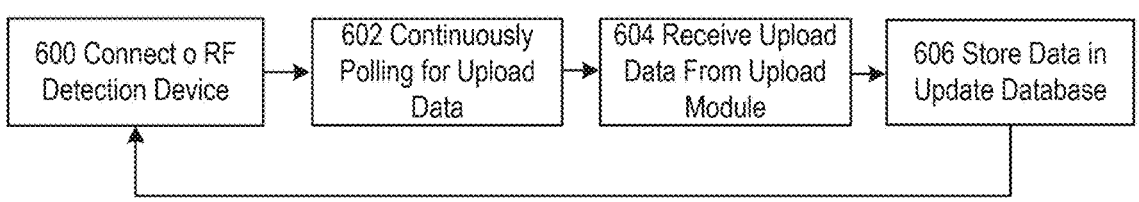
FIG. 6 is a flow chart of a method performed by a Data Collection Module, according to an embodiment.

FIG. 6 is a flow chart of a method performed by the data collection module 174. The process begins with the data collection module 174 connecting, at step 600, to the RF detection device 102. The data collection module 174 may connect to the RF detection device 102 through the cloud 170. The data collection module 174 may connect to a plurality of RF detection devices 102 to receive the updated data that is used to improve the pre-trained network material database 180. The data collection module 174 continuously polls, at step 602, for the upload data from the upload module 162. The data collection module 174 may continuously poll to receive updated data from a number of RF detection devices 102. The data collection module 174 receives, at step 604, the upload data from the upload module 162. The upload data may contain the data from a detection event from the RF detection devices 102, such as the transmit signal parameters such as frequency and power levels, response signal characteristics including frequency and signal strength, and contextual environmental conditions like temperature and humidity. The data collection module 174 stores, at step 606, the data in the update database 182, and the process returns to connecting to the RF detection device 102. The update database 184 may contain the data from a detection event from the RF detection devices 102, such as the transmit signal parameters such as frequency and power levels, response signal characteristics including frequency and signal strength, the quantity and distance of the target material, and contextual environmental conditions like temperature and humidity. In some embodiments, geolocation data may be included to store the precise latitude and longitude of both the detection device and the target material and may include a timestamp indicating the exact time and date of the detection.

Figure 7:
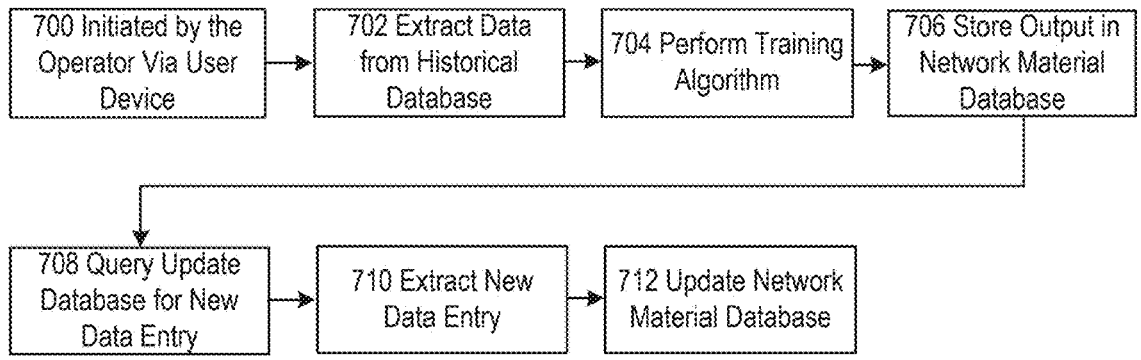
FIG. 7 is a flow chart of a method performed by a Learning Module, according to an embodiment.

FIG. 7 is a flow chart of a method performed by the learning module 176. The process begins with the learning module 176 being initiated, at step 700, by the operator via the user device 186. In some embodiments, the operator may connect to the detection network 172 to input historical data, pre-process historical data, normalize the historical data, etc., to ensure that the training algorithm can be properly executed to create the pre-trained database, the network material database 180, allowing the RF detection devices 102 to more accurately detect target materials. The learning module 176 extracts, at step 702, the data from the historical database 184. The historical database 184 may contain data collected from multiple RF detection devices 102 deployed in various environments. In some embodiments, the data originates from the RF detection devices' 102 frequent field operations, where they record interactions with different materials. The historical database 184 may contain detailed logs of transmit signal parameters, such as frequency and power levels, as well as response signal characteristics, such as frequency and signal strength. In some embodiments, the historical database 184 may include contextual information, such as environmental factors, for example, temperature, humidity, etc., geolocation coordinates, for example, latitude and longitude, of both the detection event and the target material, and timestamps for each detection event. Each entry in the historical database 184 may represent a data point captured during a detection event. The data points may contain the transmit frequency, which is the frequency at which the RF signal was transmitted, and the transmit power level, indicating the signal's strength. The response frequency denotes the frequency of the signal reflected back from the target material, while the response signal strength measures the intensity of this returned signal. In some embodiments, environmental factors may also be stored to provide context for the detection conditions, including temperature and humidity levels at the time of detection. In some embodiments, geolocation data may specify the exact location of the detection event and the target material, and the timestamp may record the precise time and date. The historical database 184 may be used for the training and refinement of the training model. By analyzing patterns and relationships within this data, the models may learn to identify specific materials based on their unique electromagnetic signatures. For example, the database enables the clustering of similar detection events, helping to classify materials with similar response patterns. These clusters are then used to create a pre-trained network material database 180, which the RF detection devices 102 may reference in real time to compare new detections against historical data. This comparison allows the RF detection devices 102 to accurately determine the type, quantity, distance, and location of detected materials, significantly enhancing their detection capabilities. The learning module 176 performs, at step 704, the training algorithm. For example, the training algorithm may begin by preparing the historical data, which may include extracting relevant features such as the transmit frequency, power level, response signal frequency, response signal strength, and any available environmental factors like temperature and humidity, as well as geolocation and time of detection. These features may then be normalized to ensure they are on a similar scale. The training algorithm may perform an exploratory data analysis, or EDA, to characterize the data's distribution and relationships. In some embodiments, visualization techniques like scatter plots, pair plots, and heatmaps may be employed in this analysis. In some embodiments, dimensionality reduction methods such as Principal Component Analysis, or PCA, may also be used to visualize the high-dimensional data in two or three dimensions, providing insights into potential clustering structures. Based on the data analysis, the training algorithm may select an appropriate clustering algorithm. For example, K-Means Clustering may be chosen for its effectiveness with well-separated clusters and scalability for large datasets. The clustering process begins with the initialization step, where the module chooses the number of clusters, or "k" and initializes cluster centroids randomly. In the assignment step, each data point may be assigned to the nearest cluster centroid based on Euclidean distance. The centroids are then updated by recalculating them as the mean of all data points assigned to each cluster. This assignment and update process is iterated until convergence, which occurs when cluster assignments no longer change, or the centroids stabilize. Once the clusters are formed, each cluster represents a group of data points with similar characteristics. These clusters may then be analyzed to identify patterns and relationships between the transmit and response signal features. The resulting cluster centroids and the characteristics of the data points within each cluster are stored in the network material database 180. This trained database may then be used by the RF detection devices 102 to compare real-time data with the historical clusters, allowing the devices to determine the quantity and distance of target materials based on the similarity to known clusters. For example, the historical database 184 may contain instances where the RF detection device 102 detected different materials, such as explosives and chemical substances. The data may include the transmit signal's frequency and power levels, the corresponding response signal's frequency and strength, and environmental factors like temperature and humidity. For example, historical data might include transmit frequencies of 1160 Hz, 1200 Hz, 1300 Hz, and 1400 Hz, with power levels at 160 V and 320 V. The response signals recorded could have frequencies matching the transmit frequencies with varying signal strengths, such as 50 dB, 55 dB, 60 dB, and 65 dB. In some embodiments, the environmental conditions under which these measurements were taken may be stored, providing context for the signal data. The training algorithm may normalize this data to ensure consistency across different scales, making it suitable for clustering. The training algorithm may then use visualization techniques like scatter plots and heatmaps to identify any initial patterns or relationships. In some embodiments, the training algorithm may apply a dimensionality reduction technique, such as PCA, to help in visualizing high-dimensional data in a simplified form, revealing clusters that might not be immediately apparent. Using K-Means Clustering, the training algorithm may set an initial number of clusters, or k, such as 3, and randomly initialize cluster centroids. Each data point is assigned to the nearest centroid based on Euclidean distance, forming initial clusters. The centroids are then recalculated as the mean of the points in each cluster, and this process repeats iteratively until the cluster assignments stabilize. Through this clustering process, distinct groups of data points may emerge, each representing a specific material's unique response pattern to the transmitted RF signals. For example, one cluster might correspond to a type of explosive with a specific set of response frequencies and signal strengths under certain environmental conditions. Another cluster could represent a chemical substance with different characteristics. The resulting cluster centroids and their defining features may be stored in the pre-trained network material database 180. When an RF detection device 102 encounters new data, it can compare it against the network material database 180 to identify the material by finding the closest matching cluster. This enables the RF detection device 102 to accurately determine the quantity and distance of the detected material based on historical patterns. The learning module 176 stores, at step 706, the output in the network material database 180. The network material database 180 may contain a unique material profile, derived from clustering similar detection events. The profiles may include the transmit frequency, which indicates the optimal frequency for detecting the material, and the corresponding transmit power level. The response frequency represents the frequency of the signal reflected back from the target material, while the response signal strength indicates the intensity of this returned signal. In some embodiments, environmental factors may be recorded to provide context for the detection conditions. The network material database 180 may include information on the relationship between the response signal strength and the known quantities and distances of the material from historical data, allowing the database to infer the quantity and distance of the target material during new detection events. For example, a stronger response signal might indicate a larger quantity of material or a closer distance, and these relationships are meticulously mapped out in the database. The RF detection devices 102 may utilize this pre-trained network material database 180 by comparing new detection data against the stored profiles. When a detection event occurs, the RF detection device 102 matches the real-time data with the closest profiles in the database, allowing it to accurately identify the material. By analyzing the matched profile's signal strength patterns, the device can estimate the quantity of the material and determine its distance. The learning module 176 queries, at step 708, the update database 182 for a new data entry. The update database 184 may contain the data from a detection event from the RF detection devices 102, such as the transmit signal parameters such as frequency and power levels, response signal characteristics including frequency and signal strength, and contextual environmental conditions like temperature and humidity. In some embodiments, geolocation data may be included to store the precise latitude and longitude of both the detection device and the target material and may include a timestamp indicating the exact time and date of the detection. If there is a new data entry stored in the update database 182, the learning module 176 extracts, at step 710, the new data entry from the update database. The learning module 176 updates, at step 712, the network material database 180, and the process returns to querying the update database 182 for a new data entry. For example, the learning module 176 may validate and preprocess the new data entry. The data entry may include the transmit frequency, power level, response signal frequency, response signal strength, and environmental conditions, such as temperature, humidity, geolocation coordinates, and timestamps. The learning module 176 may then integrate the data entry into the training algorithm. The training algorithm may reassess the new data point in the context of the existing clusters within the network material database 180. Suppose the new data entry closely matches an existing cluster. In that case, it may be added to that cluster, refining the centroid and the boundaries of the cluster to help improve the accuracy of the material profile by incorporating the latest data, which might reflect new variations in material detection patterns due to changing environmental conditions or device settings. In some embodiments, if the new data entry does not fit well into any existing clusters, the training algorithm will evaluate whether it represents a new material or a significantly different condition for an existing material. If so, the training algorithm may create a new cluster, thereby expanding the network material database 180 to accommodate new types of materials or detection scenarios. For example, if the learning module 176 extracts a new data entry from an RF detection device 102 operating in a humid environment with a transmit frequency of 1300 Hz and a power level of 320 V. The response signal may show a frequency of 1300 Hz and a strength of 65 dB. The environmental conditions recorded may be a temperature of 30° C. and humidity of 85%, with geolocation coordinates indicating a specific location. The preprocessing step normalizes these data points, ensuring they are on the same scale as the existing data in the database. The training algorithm may then integrate this new data. For example, suppose the new data closely matches an existing cluster corresponding to a chemical substance detected in similar environmental conditions but slightly different signal strengths. In that case, the training algorithm may update the cluster centroid and adjust its boundaries to incorporate this new data entry. If the new data entry shows a distinct pattern that does not match any existing clusters, the training algorithm may create a new cluster. For example, if the high humidity significantly alters the response signal, making it unique from previous detections, a new cluster will be formed. This new cluster will represent this specific material's detection profile under high humidity conditions, ensuring the network material database 180 remains relevant and adaptable. Then, the training algorithm may update the pre-trained network material database 180 with the refined or new clusters.

Figure 8:
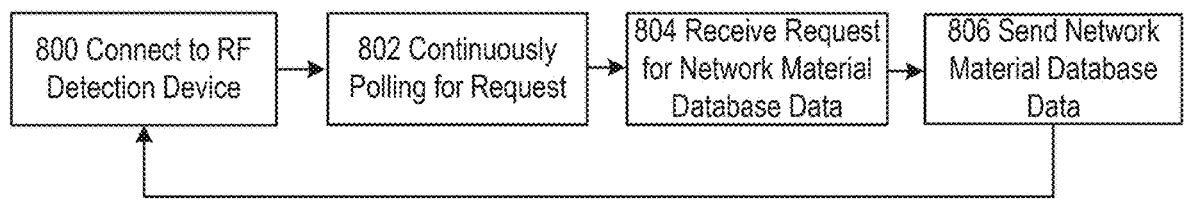
FIG. 8 is a flow chart of a method performed by an Update Module, according to an embodiment.

FIG. 8 is a flow chart of a method performed by the update module 178. The process begins with the update module 178 connecting, at step 800, to the RF detection device 102. The update module 178 may connect to the RF detection device 102 through the cloud 170. The update module 178 may connect to a plurality of RF detection devices 102 to send the pre-trained network material database 180. The update module 178 continuously poll, at step 802, for a request from the base module 156 for the data in the network material database 180. The update module 178 may receive a request from the RF detection devices 102 once the device is activated. In some embodiments, the update module 178 may receive a version ID that relates to the version of the pre-trained network material database 180 currently operating on the RF detection device 102. If the update module 178 determines that there is a newer version, the update module 178 sends the updated network material database 180. The update module 178 receives, at step 804, a request for the data in the network material database 180. In some embodiments, the update module 178 may receive a version ID that relates to the version of the pre-trained network material database 180 currently operating on the RF detection device 102. If the update module 178 determines that there is a newer version, the update module 178 sends the updated network material database 180. The update module 178 sends, at step 806, the data in the network material database 180, and the process returns to connecting to the RF detection device 102. The network material database 180 may contain a unique material profile derived from clustering similar detection events. The profiles may include the transmit frequency, which indicates the optimal frequency for detecting the material, and the corresponding transmit power level. The response frequency represents the frequency of the signal reflected back from the target material, while the response signal strength indicates the intensity of this returned signal. In some embodiments, environmental factors may be recorded to provide context for the detection conditions. The network material database 180 may include information on the relationship between the response signal strength and the known quantities and distances of the material from historical data, allowing the database to infer the quantity and distance of the target material during new detection events. For example, a stronger response signal might indicate a larger quantity of material or a closer distance, and these relationships are meticulously mapped out in the database. The RF detection devices 102 may utilize this pre-trained network material database 180 by comparing new detection data against the stored profiles. When a detection event occurs, the RF detection device 102 matches the real-time data with the closest profiles in the database, allowing it to accurately identify the material. By analyzing the matched profile's signal strength patterns, the device can estimate the quantity of the material and determine its distance.

The functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

What is claimed is:

1. A method comprising:
accessing a pre-trained specific material database associating each of a plurality of materials with a corresponding material profile, each material profile including one or more parameters including at least one of a transmit frequency and a response frequency;
receiving a selection of a target material from a user;
identifying first material profile associated with the target material using the pre-trained specific material database;
transmitting, via an RF detection device, an RF signal into the target material using the one or more parameters for the target material associated with the first material profile;
receiving, via the RF detection device, a response signal from the target material;
analyzing the response signal using an AI algorithm to determine whether resonance characteristics of the response signal indicate a presence of the target material; and
notifying the user if the presence of the target material is indicated by the resonance characteristics, wherein the method further comprises determining, prior to transmitting the RF signal, one or more contextual environmental conditions, wherein the AI algorithm uses the one or more contextual environmental conditions to determine whether the resonance characteristics for the target material are present.

2. The method of claim 1, wherein transmitting includes:
transmitting the RF signal into the target material using the transmit frequency associated with the first material profile.

3. The method of claim 1, wherein analyzing the response signal includes:
determining a frequency of the response signal; and
comparing the frequency of the response signal to the response frequency associated with the first material profile.

4. The method of claim 1, wherein the pre-trained specific material database includes information relating a signal strength of the response signal with one or more of a quantity or a distance of the target material based on historical data, and wherein analyzing the response signal includes:
measuring the signal strength of the response signal; and
determining the quantity of the target material or the distance of the target material based on the measured signal strength of the response signal based on the information.

5. The method of claim 4, wherein a stronger response signal indicates a larger quantity of the target material or a closer distance of the target material.

6. The method of claim 1, wherein the transmit frequency is related to an atomic structure of the target material.

7. The method of claim 1, wherein the first material profile includes a plurality of transmit frequencies for the target material, and wherein transmitting includes transmitting the RF signal into the target material using the plurality of transmit frequencies.

8. The method of claim 1, wherein the one or more contextual environmental conditions include, for the RF detection device and/or the target material, one or more of:

a temperature;
a humidity;
a time; and
a geolocation.

9. The method of claim 1, wherein the pre-trained specific material database includes an AI model, and wherein the AI model is pre-trained by associating response signals with RF frequencies transmitted into known materials.

10. A system comprising:
a user interface configured to receive a selection by a user of a target material;
a communication interface configured to access a first material profile for the target material in a pre-trained specific material database associating each of a plurality of materials with a corresponding material profile, each material profile including one or more parameters including at least one of a transmit frequency and a response frequency;
an RF transmitter configured to transmit an RF signal into the target material using the one or more parameters for the target material associated with the first material profile;
an RF receiver configured to receive a response signal from the target material;
a processor configured to analyze the response signal using an AI algorithm to determine whether resonance characteristics of the response signal indicate a presence of the target material; and
one or more sensors configured, prior to transmitting the RF signal, to determine one or more contextual environmental conditions; wherein the AI algorithm uses the one or more contextual environmental conditions to determine whether the resonance characteristics for the target material are present,
wherein the user interface is further configured to notify the user if the presence of the target material is indicated by the resonance characteristics.

11. The system of claim 10, wherein the RF transmitter is configured to transmit the RF signal into the target material using the transmit frequency associated with the first material profile.

12. The system of claim 10, wherein the processor is configured to analyze the response signal by:
determining a frequency of the response signal; and
comparing the frequency of the response signal to the response frequency associated with the first material profile.

13. The system of claim 10, wherein the pre-trained specific material database includes information relating a signal strength of the response signal with one or more of a quantity or a distance of the target material based on historical data, wherein the processor is configured to analyze the response signal by:
measuring the signal strength of the response signal; and
determining the quantity of the target material or the distance of the target material based on the measured signal strength of the response signal based on the information.

14. The system of claim 13, wherein a stronger response signal indicates a larger quantity of the target material or a closer distance of the target material.

15. The system of claim 10, wherein the transmit frequency is related to an atomic structure of the target material.

16. The system of claim 10, wherein the first material profile includes a plurality of transmit frequencies for the target material, and wherein the RF transmitter is further configured to transmit the RF signal into the target material using the plurality of transmit frequencies.

17. The system of claim 10, wherein the one or more contextual environmental conditions include, for the RF receiver and/or the target material, one or more of:
a temperature;
a humidity;
a time; and
a geolocation.

18. The system of claim 10, wherein the pre-trained specific material database includes an AI model, and wherein the AI model is pre-trained by associating response signals with RF frequencies transmitted into known materials.

* * * * *